(12) United States Patent
Bungo et al.

(10) Patent No.: US 7,134,190 B2
(45) Date of Patent: Nov. 14, 2006

(54) WIRE HARNESS MANUFACTURING MACHINE

(75) Inventors: Edward M. Bungo, Cortland, OH (US); James A. Gourash, Cortland, OH (US); Shao Chung Hsieh, Warren, OH (US); John Thomas Kightlinger, Canfield, OH (US); Nick M. Loprire, Cortland, OH (US); Robert Alan McFall, West Farmington, OH (US); John C. McLane, Girard, OH (US); Andrew F. Rodondi, Sharpsville, PA (US); Mark J. Vanden Wymelenberg, Girard, OH (US)

(73) Assignee: Delphi Technologies, Inc., Troy, MI (US)

( * ) Notice: Subject to any disclaimer, the term of this patent is extended or adjusted under 35 U.S.C. 154(b) by 67 days.

(21) Appl. No.: 10/302,131

(22) Filed: Nov. 22, 2002

(65) Prior Publication Data

US 2003/0100228 A1 May 29, 2003

Related U.S. Application Data

(63) Continuation-in-part of application No. 10/205,245, filed on Jul. 25, 2002, now Pat. No. 6,837,751, and a continuation-in-part of application No. 09/993,797, filed on Nov. 24, 2001, now Pat. No. 6,588,646.

(51) Int. Cl.
*H01R 43/00* (2006.01)

(52) U.S. Cl. .......................... 29/753; 29/860; 29/861; 29/857; 29/866; 29/867; 29/748; 29/745; 29/747; 29/751; 29/761; 29/33 F; 29/33 M; 228/110.1

(58) Field of Classification Search .................. 29/860, 29/861, 857, 866, 867, 748, 745, 747, 751, 29/753, 761, 33 F, 33 M; 228/110.1, 111
See application file for complete search history.

(56) References Cited

U.S. PATENT DOCUMENTS

| | | | |
|---|---|---|---|
| 3,717,842 A * | 2/1973 | Douglas, Jr. .................. 29/860 |
| 3,822,465 A * | 7/1974 | Frankort et al. ............. 228/111 |
| 4,753,614 A | 6/1988 | Weiner |
| 4,817,814 A * | 4/1989 | Coto et al. ................ 228/110.1 |
| 5,168,613 A * | 12/1992 | Bair et al. .................. 29/33 M |
| 5,309,634 A * | 5/1994 | Van Order et al. ........... 29/863 |
| 5,495,662 A | 3/1996 | Nitta et al. |
| 5,820,411 A | 10/1998 | Okabe |
| 6,086,385 A | 7/2000 | Wang et al. |
| 6,142,813 A | 11/2000 | Cummings et al. |
| 6,162,085 A | 12/2000 | Chugh et al. |
| 6,171,146 B1 | 1/2001 | Fink et al. |
| 6,179,658 B1 | 1/2001 | Gunay et al. |
| 6,203,364 B1 | 3/2001 | Chupak et al. |
| 6,208,233 B1 | 3/2001 | Stein, Sr. et al. |
| 6,247,951 B1 | 6/2001 | Di Liello et al. |
| 6,247,965 B1 | 6/2001 | Cummings et al. |
| 6,305,957 B1 | 10/2001 | Fink et al. |
| 6,319,071 B1 | 11/2001 | Sato |
| 6,338,651 B1 | 1/2002 | Svette, Jr. et al. |
| 6,345,706 B1 | 2/2002 | Oliver et al. |
| 6,360,436 B1 * | 3/2002 | Takada ........................ 29/861 |
| 6,406,307 B1 | 6/2002 | Bungo et al. |
| 6,443,137 B1 | 9/2002 | Kraft et al. |
| 6,454,060 B1 | 9/2002 | Lisenker et al. |
| 6,494,751 B1 | 12/2002 | Morello et al. |
| 6,508,666 B1 | 1/2003 | Francis |
| 6,533,588 B1 | 3/2003 | Woith et al. |
| 6,533,611 B1 | 3/2003 | Morello et al. |
| 6,535,396 B1 | 3/2003 | Degenkolb et al. |
| 6,556,118 B1 | 4/2003 | Skinner |
| 6,565,372 B1 | 5/2003 | Bakker et al. |
| 6,578,444 B1 | 6/2003 | Wendelin |
| 6,783,741 B1 * | 8/2004 | Edlund et al. ............. 422/191 |
| 2001/0022233 A1 | 9/2001 | Takada et al. |
| 2001/0044240 A1 | 11/2001 | Sato et al. |

FOREIGN PATENT DOCUMENTS

DE  197 51 435  5/1999

| | | |
|---|---|---|
| EP | 0 508 695 | 10/1992 |
| EP | 0 635 904 | 1/1995 |
| EP | 0 855 767 | 7/1998 |

OTHER PUBLICATIONS

European Search Report dated Jun. 22, 2006.
European Search Report dated Mar. 29, 2006.

* cited by examiner

*Primary Examiner*—Richard Chang
(74) *Attorney, Agent, or Firm*—David P. Wood

(57) ABSTRACT

The present invention is an automated wire harness machine (40) capable of manufacturing a wire harness (42) unique in-part due to the automation process. The novel wire harness is generally a plurality of bundled, preferably un-stripped, insulated wires (46). Each un-stripped end portion (180, 182) of each wire is preferably terminated to one of a series of electrical connectors (44) of the wire harness. Each connector has at least one wafer (52) which houses a plurality of terminals (54) preferably crimped and electrically terminated to the ends of the wires. The wire harness machine preferably utilizes a pallet (56) which holds all of the wafers of one wire harness. A conveyor (58) transports the pallet and wafers through a series of stations which perform automated manufacturing steps. The first station is a terminal inserter (64) which inserts and locks the terminals within pre-assigned cavities (114) of the wafers. The next station is an automated wire loader (66) which measures, cuts and crimps the two ends of each wire into the respective terminals of the loaded wafer assembly. A third station, or ultrasonic welder (68), the galls an un-stripped non-ferrous core (270) of the crimped wire to the terminal. The pallet with the loaded wafers, crimped terminals, and terminated wires are then transported to a wire marker station (70) which marks each wire, preferably via a laser (328), for identification purposes.

11 Claims, 20 Drawing Sheets

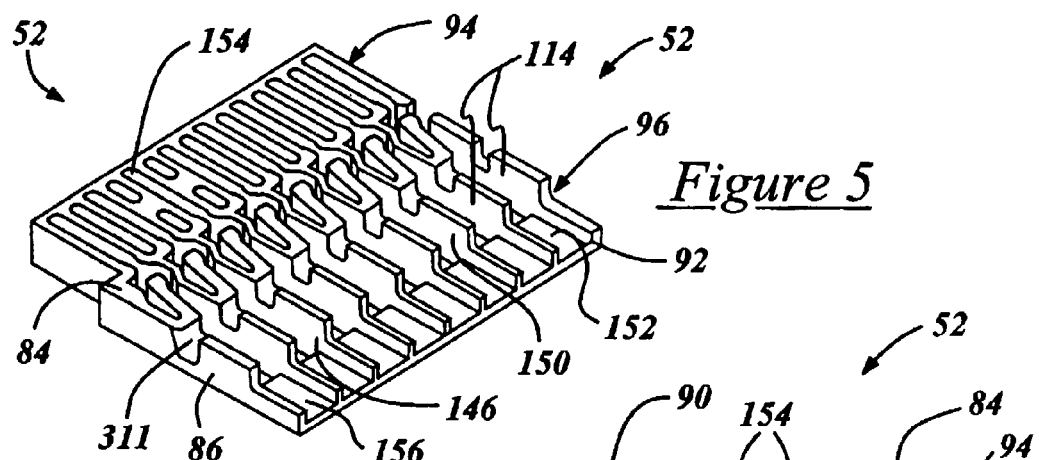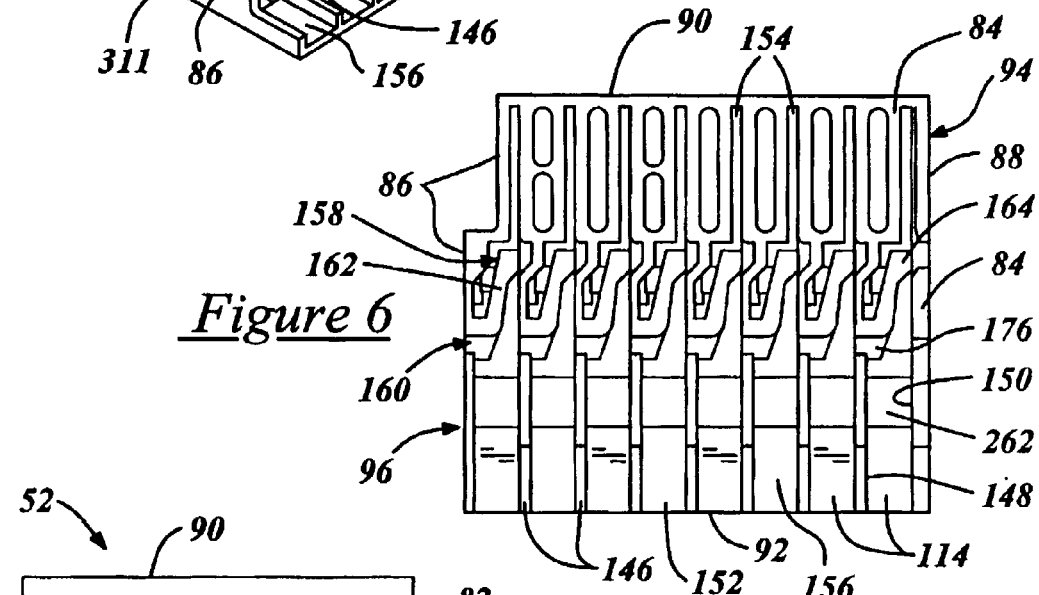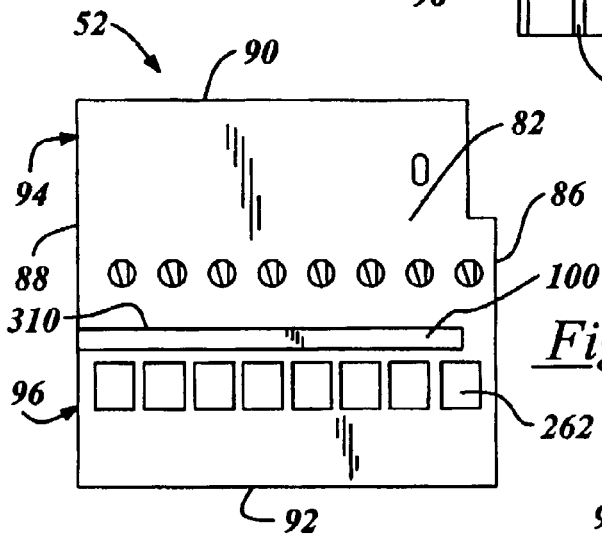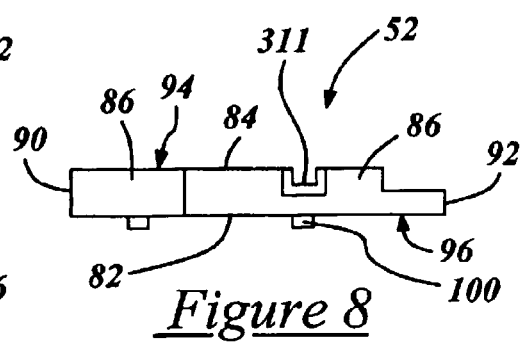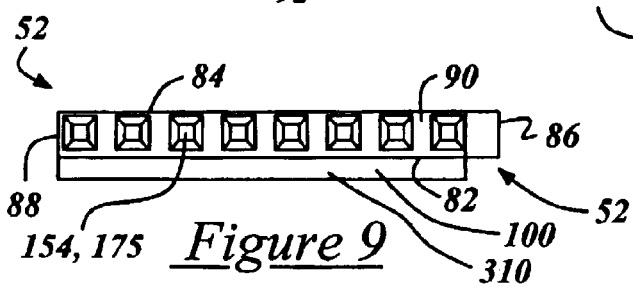

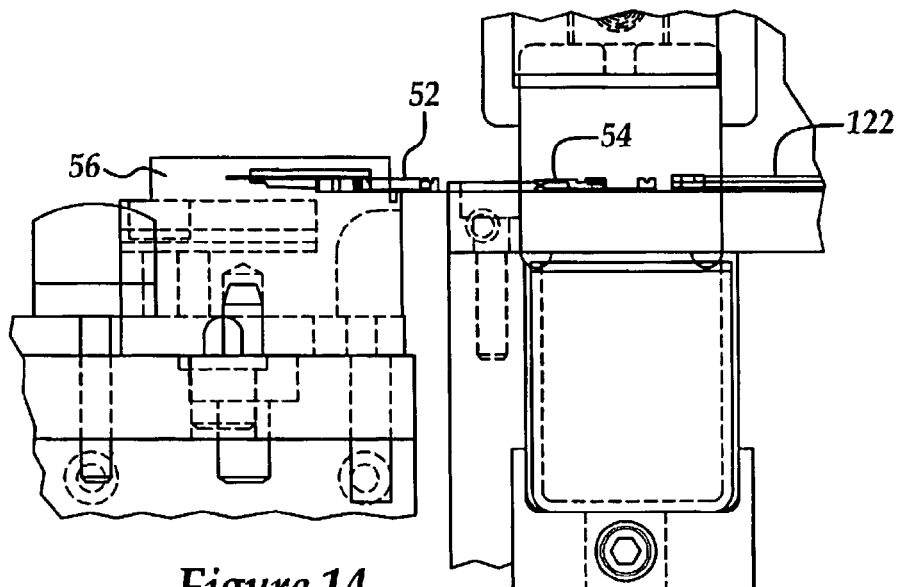
*Figure 14*
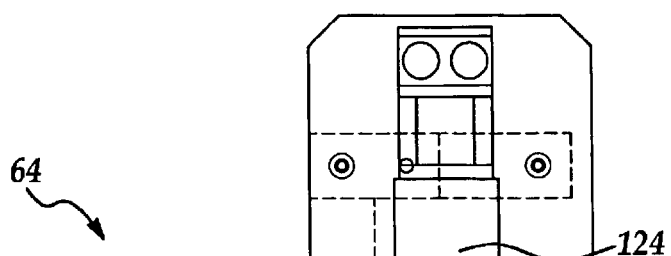
*Figure 15*
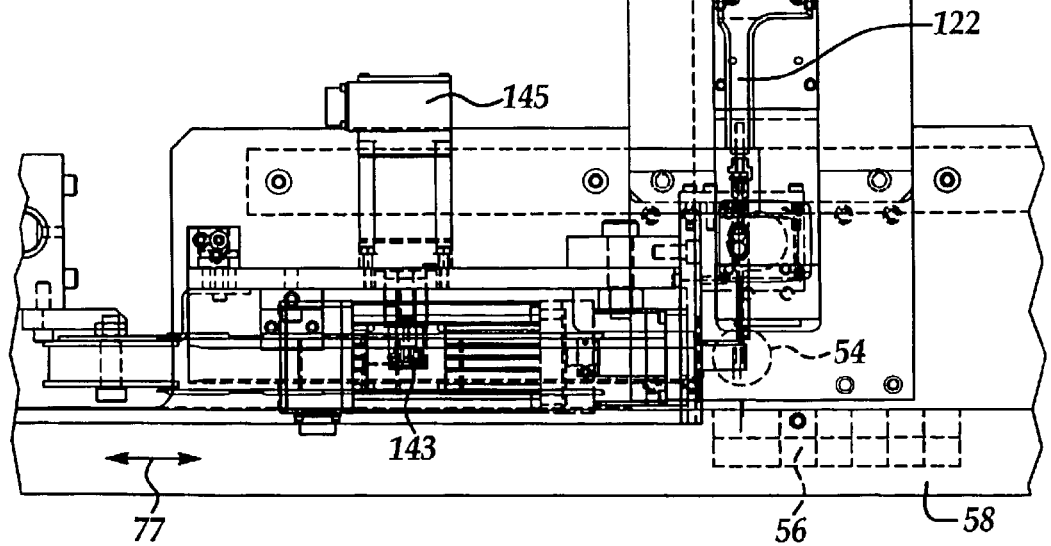

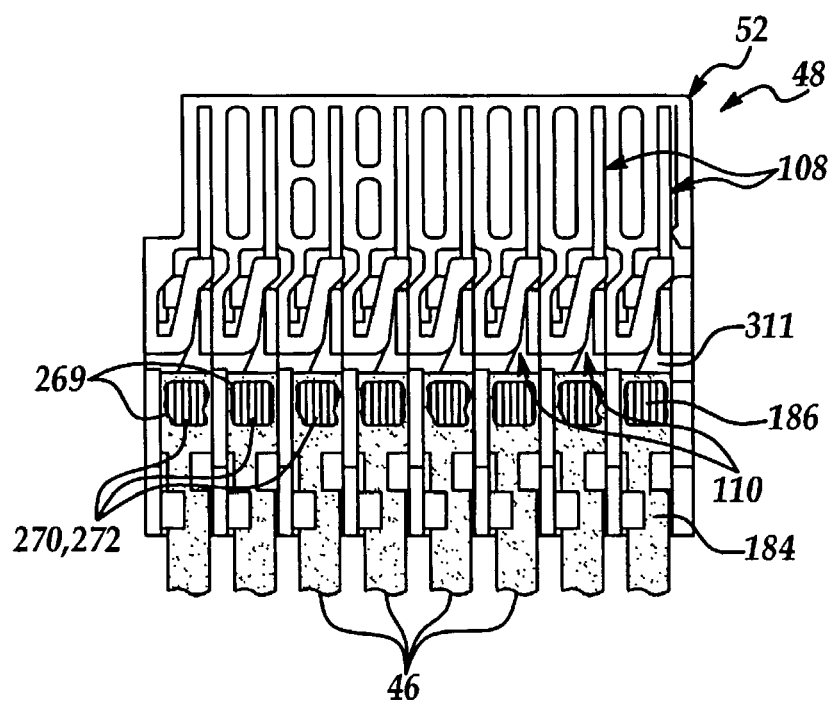
*Figure 31*
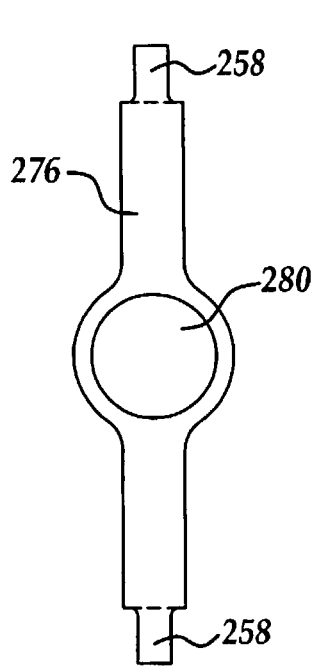
*Figure 32A*     *Figure 32B*
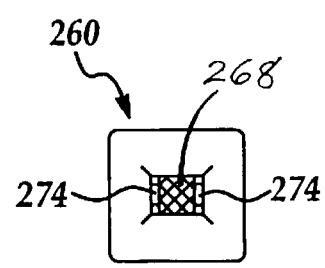
*Figure 33A*

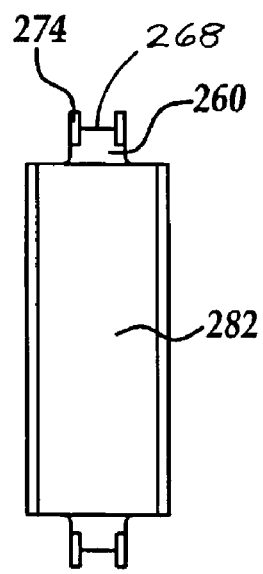
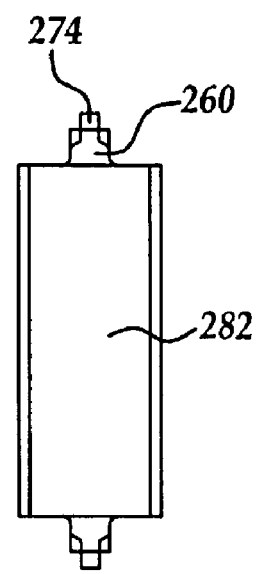
*Figure 33B*   *Figure 33C*
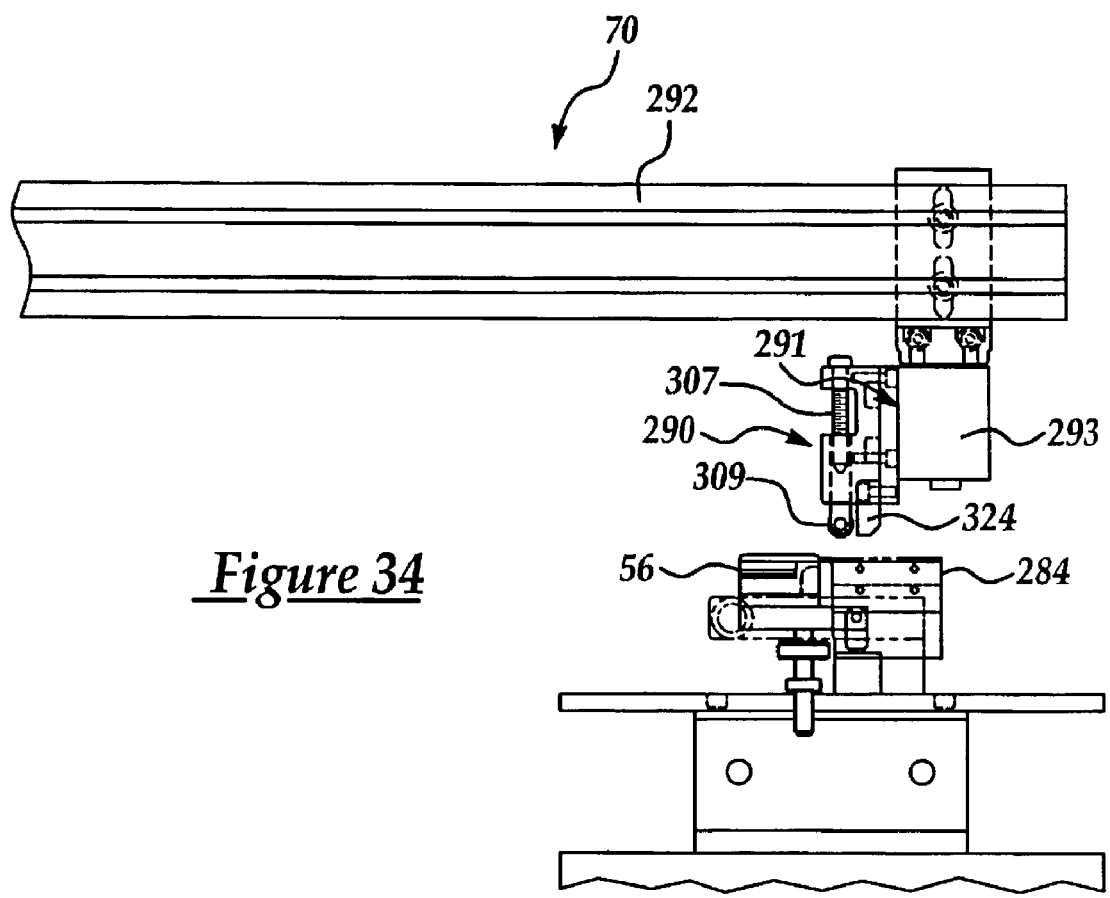
*Figure 34*

WIRE HARNESS MANUFACTURING MACHINE

RELATED PATENT APPLICATION

This is a continuation-in-part application of U.S. patent application Ser. No. 10/205,245, filed Jul. 25, 2002, and U.S. patent application Ser. No. 09/993,797, filed Nov. 24, 2001 now U.S. Pat. No 6,588,646.

TECHNICAL FIELD

The present invention relates to an electrical connector, and more particularly to electrical connectors utilized in a wire harness produced by an automated electrical wire harness manufacturing machine.

BACKGROUND OF THE INVENTION

Electrical wire harnesses for automotive and other applications are assembled primarily through the use of manual labor. Areas of production which contribute toward an appreciable degree of manual intervention include: measuring and cutting predetermined wire lengths, stripping of insulation jackets from each end of the cut wire, crimping a terminal to the insulation jacket near the stripped end of the wire, electrically engaging the stripped end of the wire to the terminal, and inserting the terminal into a connector housing. Each manual intervention during the manufacturing process is time consuming and can contribute toward operator error, high manufacturing costs and/or a degradation of the overall quality of the wire harness.

Known methods to electrically engage multi-stranded conductors or cores of wires to terminals requires the removal of the insulation jacket at the electrical engagement area to achieve reliable electrical conductivity. Unfortunately, and especially true for smaller gauge multi-stranded wire, the stripping process can lead to conductor/core damage thus prohibiting the use of more fragile smaller gauge wires in many electrical applications. Consequently, the cost in copper for larger gauge wire is expensive, the overall bulk of the wire harness is large and weight of the wire harness is high. Moreover, coupled with large gauge wiring and bulky harnesses, the terminals and thus electrical connector housings attached to the distal ends of the wire harness are subsequently larger than otherwise necessary.

Because wire harnesses often contain dozens, if not hundreds of wires, often having varying wire gauges and wire lengths routed to a plurality of separate connectors, various means of identifying the wires and thus preventing wrong terminations, or simply poor terminations have been utilized. One such means is assigning a specific color or color pattern of insulation jacket 178 to a specific gauge wire size. This technique can be limiting and cumbersome in the manufacturing environment of wire harnesses, because the wire must be identified prior to the termination of the wire to the terminal and insertion of the terminal into the connector housing. Moreover, the wires, terminals, and/or connector terminal cavities must still be identified to assure proper terminations and possibly assist in maintenance issues. Such identification has typically been done with ink print on the outside of the wire which has a tendency to wear off in a harsh environment.

SUMMARY OF THE INVENTION

The present invention is an automated wire harness manufacturing machine capable of producing a wire harness which is unique in-part to the automation process. The novel wire harness is generally a plurality of bundled, preferably un-stripped insulated wires. Each un-stripped end of each wire is preferably engaged electrically to one of a series of electrical connectors of the wire harness. Each connector has a series of stacking wafers which house a plurality of terminals preferably crimped and terminated electrically to the end portions of the insulated wires.

The wire harness manufacturing machine preferably utilizes a pallet which holds all of the wafers of one wire harness. A conveyor transports the pallet and wafers through a series of stations which perform a series of automated sequential manufacturing steps. The first station is a terminal inserter which inserts and locks the terminals within pre-assigned cavities of the wafers. The next station is an automated wire loader which selects the gauge wire, feeds it, measures, cuts, places and crimps the two ends of each selected wire into the respective terminals of the loaded wafer assembly. A third station, or ultrasonic welder, then galls the non-ferrous core of the crimped wire to the terminal. The pallet with the loaded wafers, crimped terminals, and terminated wires are then transported to a wire marker station which marks each wire, preferably via a laser, for identification purposes.

Two crimping devices of the wire loader station preferably crimp a pair of wings of the terminal about an insulation jacket of the respective end portions of each wire. The crimping devices preferably load the wire, having any one of a wide range of wire gauges, into respective and commonly designed terminals via preestablished crimping distances or downward movement dependent upon the gauge of wire selected and controlled via a controller. During the cutting and loading of each wire, an elongated peak of each crimping device preferably imprints the un-stripped ends of each wire to assist the ultrasonic welding process to be performed at the next ultrasonic welder station.

The ultrasonic welder has a novel tip which contacts the top of the un-stripped and imprinted, wire end portion to be welded. A unique anvil of the welder projects upward toward the tip and through a window of the wafer to engage a bottom surface of the terminal pre-seated within the wafer. Because the ends of the wires are not stripped of their insulation jacket, a costly step of the traditional wire harness manufacturing process is eliminated. In addition, the traditional method of stripping stranded wire cores or conductors of their insulation jacket would tear off some of the conductor strands degrading the electrical connection. Smaller gauged wire with far fewer strands typical can not afford strand damage, thus, larger gauged wire was often used to allow for strand damage during the stripping process. Because the wires are no longer stripped of the insulation jacket, the use of smaller gauged stranded wire, not otherwise available for particular application, is now possible. Moreover, traditionally the smaller cross sectioned wire lacked needed column strength for manual insertion of the wire or terminated lead into the connector. Whereas with the present invention, the terminals are pre-inserted into the connector. Use of smaller gauged wire saves in the cost of wire, and reduces the overall weight and bulk of the wire harness.

During the welding process, the downward movement of the tip of the ultrasonic welder compresses the wire ends against the terminal causing a tendency for the wire to move laterally with respect to the terminal and away from the desired weld location. The anvil or the tip of the welder preferably has a pair of ears which project upward beyond and on either side of the terminal to prevent this lateral wire movement and thus trap the wire end at the weld location. This trapping technique and the ability to ultrasonic weld the end portion of an un-stripped wire enables the electrical engagement of a series of small gauged wires to a single terminal, not previously achievable. Likewise, the ears will trap the conductor strands of a larger diameter wire, in effect, enabling the welding of a greater range of wire gauges not previously achievable.

The terminals are preferably of a tuning-fork design preferably having a greater thickness at a tuning fork portion end than at an opposite wire crimping portion end of the terminal. The difference in terminal thickness provides mating strength and reliability to the mating end of the terminal while maximizing the volume defined by the crimp portion of the terminal for receipt of larger gauge or multiple wires. That is, the crimping portion of the terminal is able to handle a larger wire diameter (or greater range of wire gauges) and is also able to handle a greater number of wires for multiple wire connections to one terminal. The overall effect is a compact electrical connector design which minimizes the overall size and weight of the electrical connector of the wire harness.

Because the terminals are inserted into the wafer before they are engaged electrically to the wire, a series of novel locking features of the wafer to the terminal not only hold the terminal in place when receiving the mating connector pins, but also hold the terminals in place to undergo the remainder of the manufacturing processes, previously described. During final assembly of the connector, the wafers are stacked to one another and indexed via lateral ribs which snugly fit into a linear clearance of the next adjacent wafer. The ribs also index the wafer to the pallet during the manufacturing process and help to stiffen or provide a locking feature of the wafer to the terminal which adds to the reliability of the mating and un-mating of the electrical connector.

Advantages of the present invention include a highly versatile wafer which can be utilized, amongst other application, within a connector of a wire harness. Another advantage of the present application is a terminal which provides a compact design when utilized with the wafer yet accepts large gauge wires. Yet, other advantages of the present invention is a wire harness manufacturing process which produces an inexpensive, compact, and highly reliable and maintainable wire harness with minimal manual labor.

BRIEF DESCRIPTION OF THE DRAWINGS

The presently preferred embodiments of the invention are disclosed in the following description and in the accompanied drawings, wherein:

FIG. 5 is a perspective view of a wafer of the electrical connector;

FIG. 6 is a top view of the wafer;

FIG. 7 is a bottom view of the wafer;

FIG. 8 is a side view of the wafer;

FIG. 9 is a blade receiving end view of the wafer;

FIG. 14 is an enlarged side view of the terminal inserter station taken from FIG. 13;

FIG. 15 is a top view of the terminal inserter station;

FIG. 31 is a top view of the wafer assembly illustrating a series of wires welded to the terminals;

FIG. 32A is a front view of the tip prop of the ultrasonic welder station;

FIG. 32B is a side view of the tip prop of the ultrasonic welder station;

FIG. 33A is a top view of the anvil;

FIG. 33B is a front view of an anvil prop of the ultrasonic welder;

FIG. 33C is a side view of an anvil prop;

FIG. 34 is a side view of a wire marker station;

DESCRIPTION OF THE PREFERRED EMBODIMENTS

Figure 1:
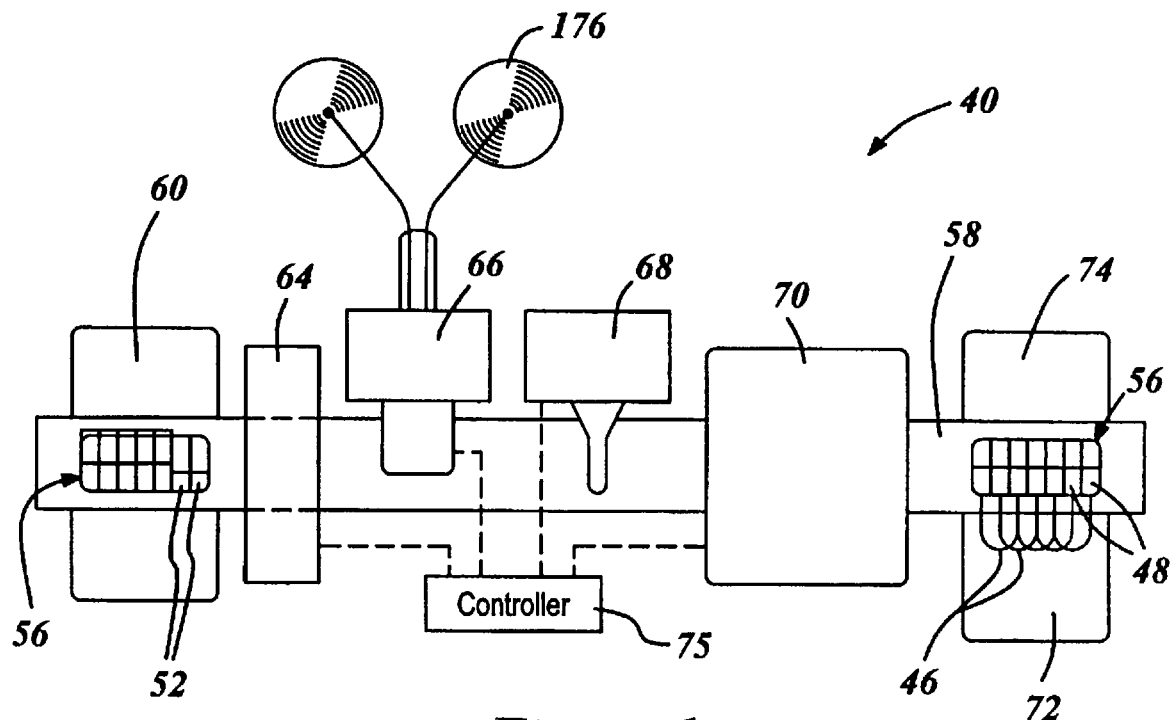
FIG. 1 is a top view of a wire harness manufacturing machine of the present invention.
Figure 2:
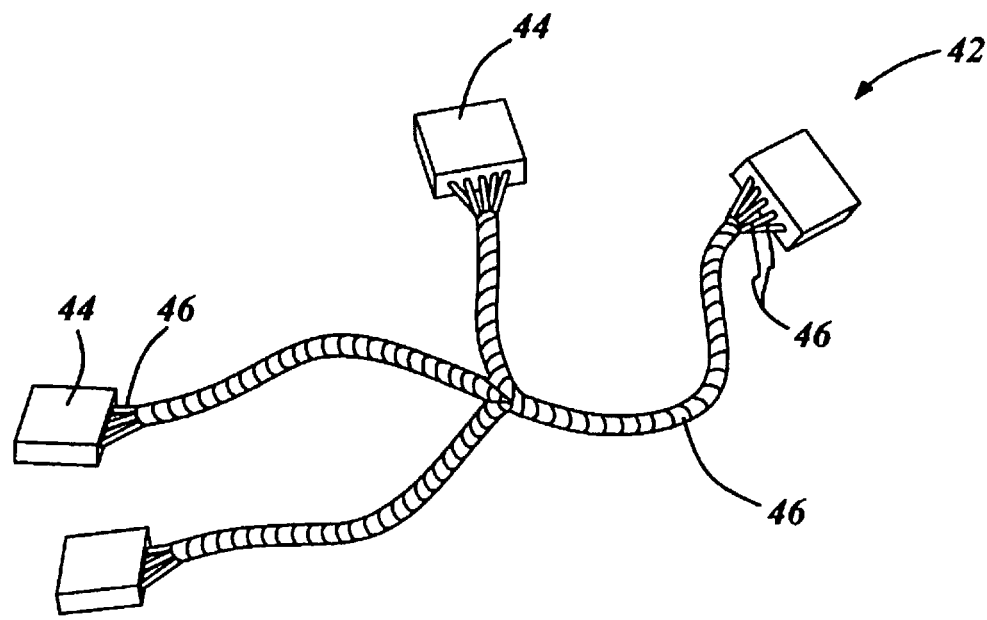
FIG. 2 is a perspective view of a wire harness of the present invention produced by the manufacturing machine.
Figure 3:
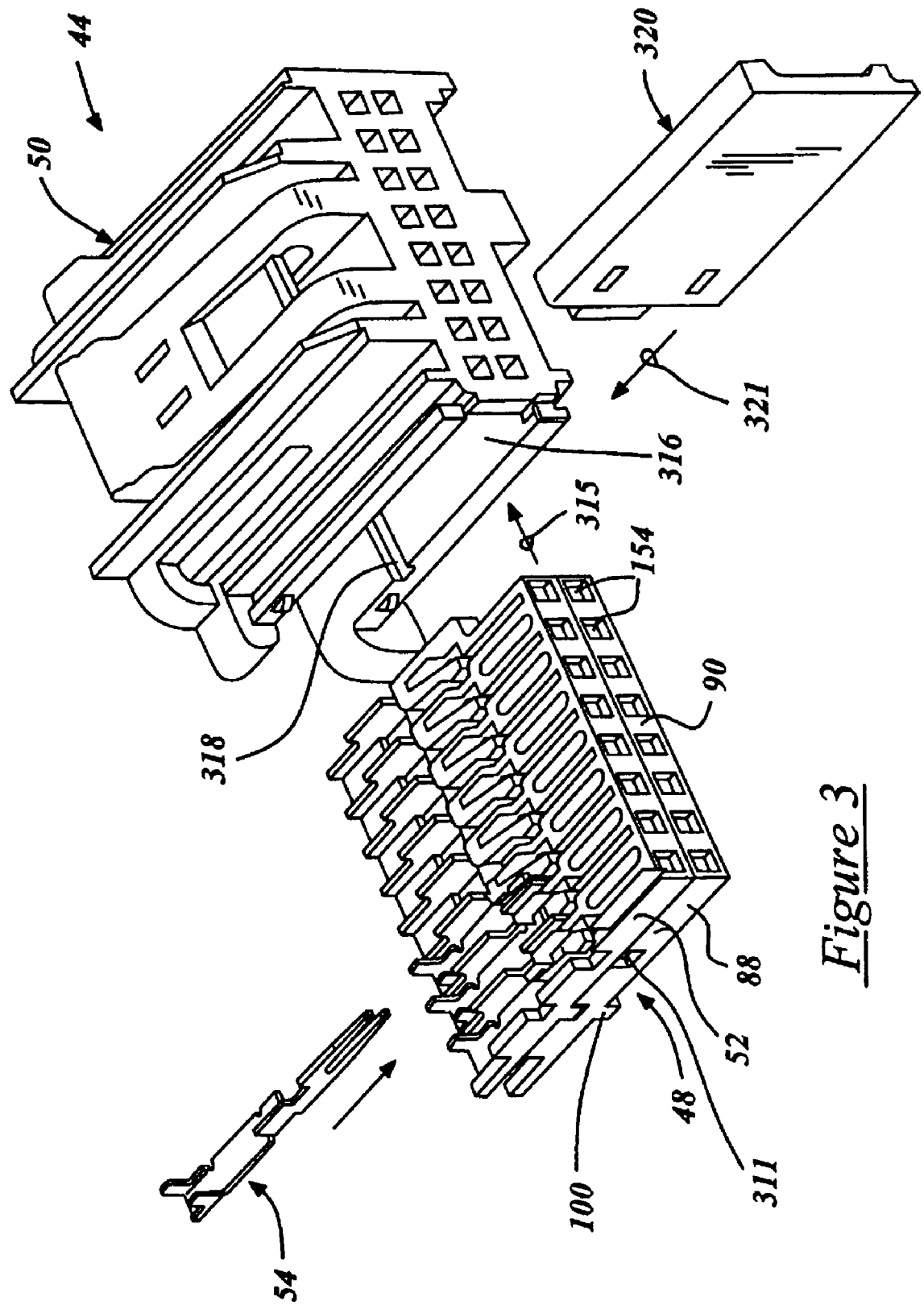
FIG. 3 is an exploded perspective view of an electrical connector of the wire harness.

Referring to FIGS. 1–3, an automated wire harness manufacturing machine 40 of the present invention produces a novel wire harness 42, as best illustrated in FIG. 2. The wire harness 42 has a plurality of connectors 44 which are interconnected electrically to one another by a series of bundled electrically insulated wires 46. Each connector 44 has plurality of wafer assemblies 48 which are stacked and indexed to one-another within a connector housing 50. An electrical insulating wafer 52 of each wafer assembly 48 houses and locks to a plurality of terminals 54 which are spaced apart and aligned side-by-side to one another via the wafer. The wafers 52 have electrically insulating properties and are preferably made of injection molded plastic. Generally, one end of at least one insulated wire 46 is terminated to a respective terminal 54 of the wafer assembly 48 of a particular connector 44, and the other end of the same wire is engaged to another wafer assembly of a different connector 44 thereby linking the connectors together, hence a mounting to the wire harness 42.

Figure 4:
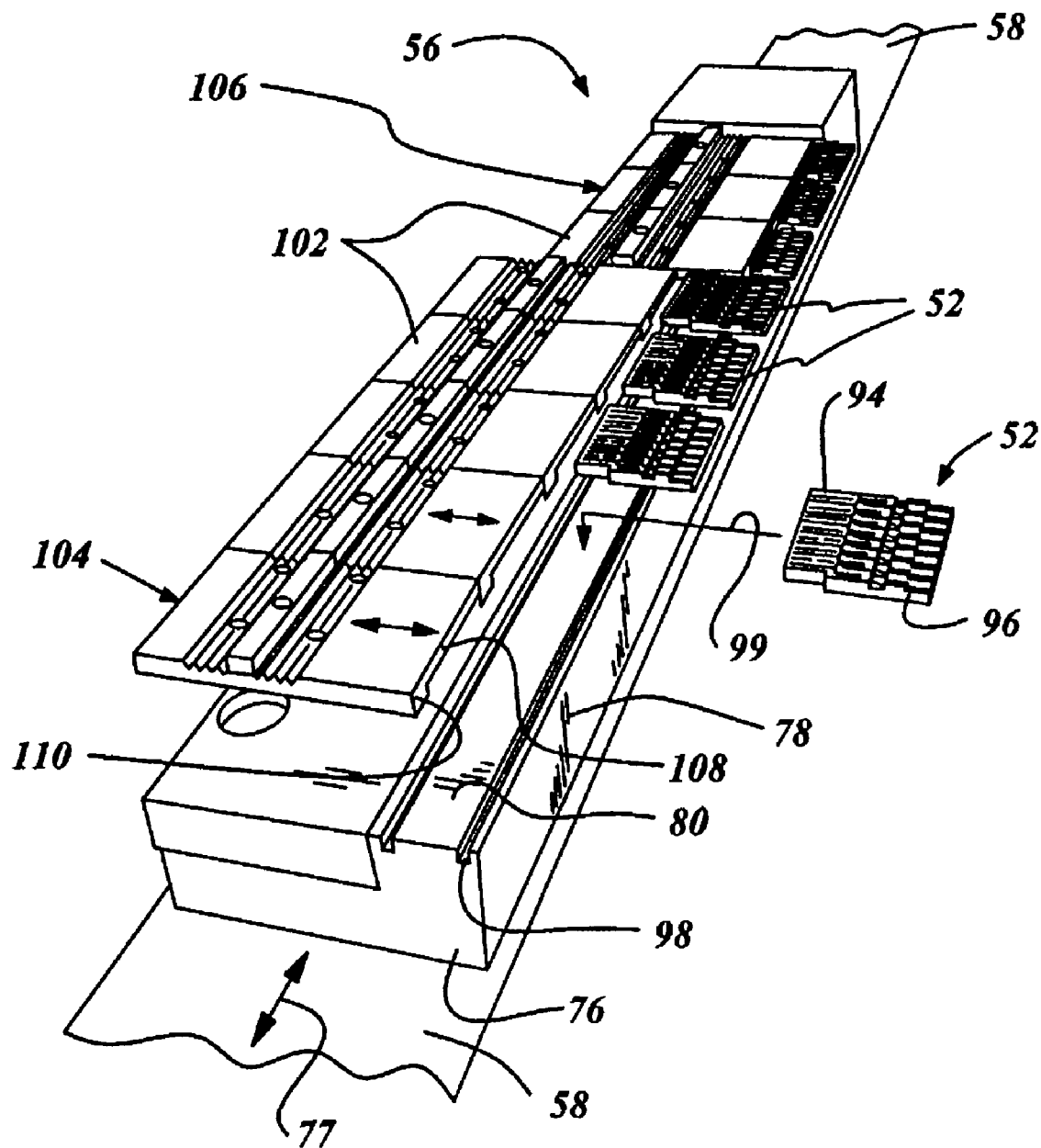
FIG. 4 is a perspective view of a pallet of the manufacturing machine.

Alternatively, the terminals 54 of a single wafer 52 can be interconnected electrically by a modified terminal or a wire looped back to terminals within the same wafer 52, thereby, functioning as a type of bus bar. Referring to FIGS. 1 and 4, the harness manufacturing machine 40 manufactures each wire harness 42 from the platform of a pallet or tray 56 which is indexed and moves along a transporter or conveyor 58. Preferably, all of the wafer assemblies 48 of any one wire harness 42 are carried via a single pallet 56 through the manufacturing process. Indexing movement of the conveyor 56 is accurate enough to align each terminal 54 of the wafer assembly 48 adjacent to each station of the manufacturing machine 40 which performs a specific function within the overall process.

The stations shown in FIG. 1 and in consecutive order along the conveyor 58 include; a pallet station 60 for mounting the pallet 56 when empty onto the conveyor 58, a wafer load station 62 for manually loading the empty wafers 52 into the pallet 56, a terminal inserter 64 for the automated insertion of the terminals 54 into the wafers 52, a wire loader 66 for the automated feed, measure, cut, placement and crimping of the wires 46 to the terminals 54 an ultrasonic welder 68 for the automated welding of the ends of the wires 46 to the respective terminals 54, a laser marker 70 for the automated marking of the wire insulation jacket thus identifying each wire 46, a harness station 72 for unloading the wafer assemblies 48 and terminated wires 46 from the pallet 56, and a second pallet station 74 for removing the pallet from the conveyor 58 and returning the empty pallets to the first pallet station 60. The various stations 64, 66, 68, 70 and advancement of the conveyor 58 are controlled automatically via a controller 75. As an alternative design, the pallet 56 may also be an integral part of the transporter or conveyor 58 which would eliminate the need for the first and second pallet stations 60, 74.

The Pallet and Pallet Loading Station:

Referring to FIG. 4, the pallet 56 is elongated along the conveyor 58 which moves in the direction of arrow 77. The pallet 56 and is large enough to receive all of the wafers 52 for at least one wire harness 42. The wafers are orientated side-by-side in a planar arrangement within the pallet 56 at the wafer load station 62 so that the terminals 54 when later inserted into the respective wafer 52 at the terminal inserter 64, are positioned substantially perpendicular to the longitude of the pallet 56.

Referring to FIGS. 4–9, when the wafers 52 are manually loaded onto the pallet 56, a bottom face 82 of the wafer 52 is in direct contact with a top surface 80 carried by a main body 76 of the pallet 56. To accommodate access for sonic welding of the terminal 54 to the wire 46 (discussed later in detail), a portion of the wafer 52 overhangs a longitudinal front surface 78 of the body 76 which is disposed substantially perpendicular to the top surface 80. A top face 84 of the wafer 52 is disposed opposite the bottom face 82 and both faces span laterally between a first and an opposite second side face 86, 88, and span longitudinally between a connector or blade receiving end face 90 and an opposite wire end face 92 of the wafer 52. The wafer 52 is generally divided between a leading portion 94 which carries the receiving end face 90, and a trailing portion 96 which carries the wire end face 92. It is the trailing portion 96 which substantially overhangs the body 76 of the pallet 56. Further description of the wafer 52 is provided in parent U.S. Pat. No.6,837,751 (co-pending application Ser. No. 10/205,245), incorporated herein by reference. Moreover, further description of the wafer 52 and how it relates to the wafer assembly 48, and how the wafer assembly 48 relates to the connector 44 as a whole will be described later within this specification.

The wafer 52 must be loaded into the pallet 56 from a substantially vertical direction, as indicated by arrow 99 of FIG. 4, so that a multifunctional rib 100 of the wafer 52 is able to fit snugly into an indexing groove 98 defined by the top surface 80 of the pallet 56. The bottom surface 82 at the leading portion 94 of the wafer 52 rests directly against the top surface 80 of the pallet 56. The groove 98 extends longitudinally with respect to the pallet 56, and the rib 100 extends laterally with respect to the wafer 56 between the first and second side faces 86, 88 and projects downward from the bottom face 82 at the trailing portion 96 and substantially near the leading portion 94 of the wafer 52.

Figure 10:
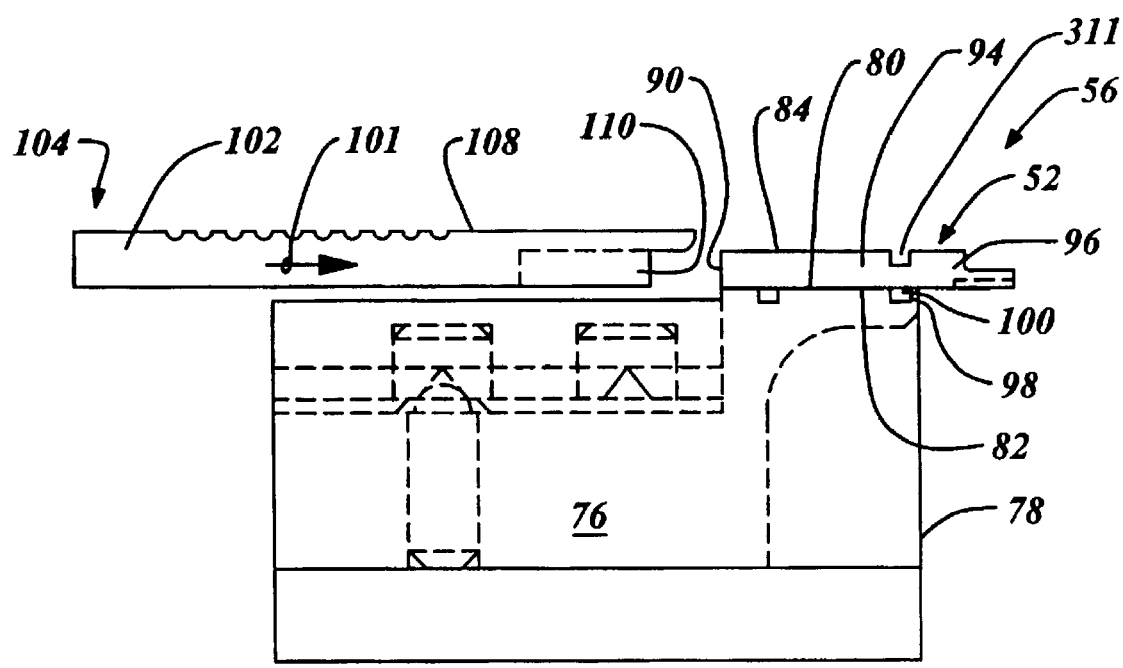
FIG. 10 is a lateral cross section of the pallet illustrating a lid of the pallet shown in an open position.
Figure 11:
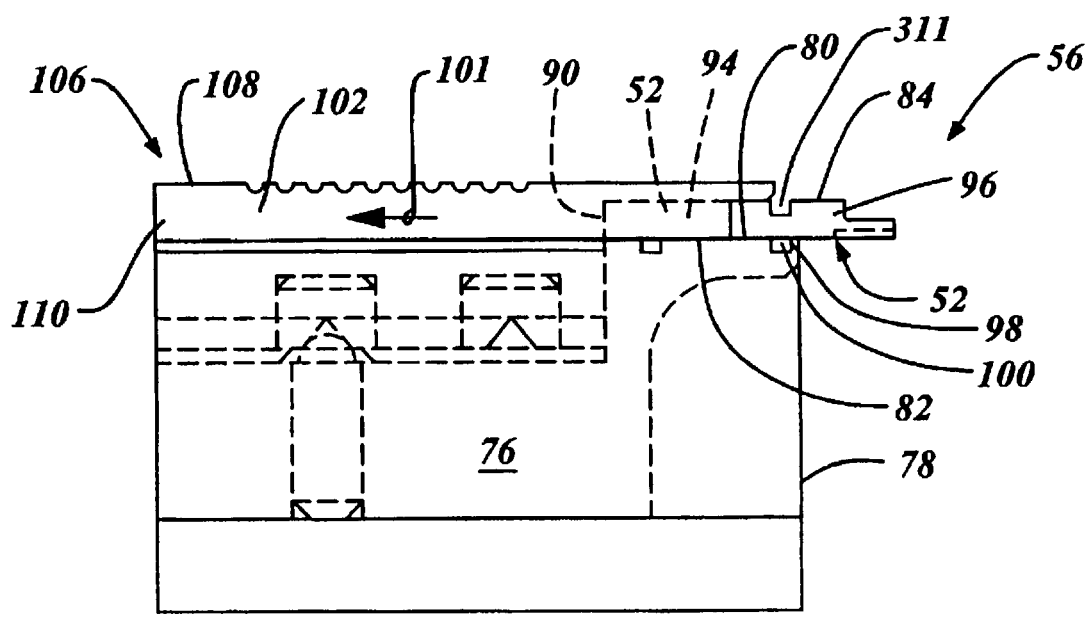
FIG. 11 is a lateral cross section of the pallet illustrating the lid shown in a closed position.

Referring to FIGS. 4, and 10–11, the pallet 56 has a series of lids or caps 102, one lid for each respective wafer 52, which serve a dual function; the first being to space the first side face 86 of one wafer away from the second side face 88 of the next adjacent wafer 52, and the second function is to prevent the wafers 52 from lifting upward out of the indexing groove 98 during the automated manufacturing process. The lids 102 are constructed and arranged to slide substantially horizontally and laterally with respect to the elongated body 76 of the pallet 56 from an open position 104 to a closed position 106 wherein the wafers 52 are secured or locked in place.

When the wafers 52 are loaded into the pallet 56 at the wafer load station 62, all of the lids 102 are initially in the open position 104. The first wafer 52 to be loaded into the pallet 56 is located at the leading end of the pallet 56 with respect to the forward moving conveyor 58. The second side face 88 of the first loaded wafer 52 is butted against a stop or upward projecting pin (not shown) of the pallet body 76 which aligns the wafer 52 longitudinally with respect to the pallet 56 and thus prevents the wafer 52 from moving in a forward direction with respect to the conveyor 58 movement. The respective lid 102 is then slid horizontally to the closed position 106 preventing the wafer 52 from lifting upward out of the laterally indexing groove 98 of the pallet 56.

Each lid 102 of the pallet 56 has a substantially planar and horizontal cover plate 108 which prevents the upward movement of the wafer 52 out of the groove 98, and an elongated shoulder or lip 110 which separates the wafer 52 from the next adjacent wafer. The lip 110 projects downward from an edge of the plate 108 which is generally disposed away or opposite from the leading end of the pallet 56, and co-extends longitudinally with the direction or axis of movement 101 of the lid 102. After the first wafer 52 is loaded into the pallet 56 and the respective lid 102 is moved to the closed position 106, the lip 110 prevents the first wafer 52 from moving longitudinally along the pallet 56 and away from the forward stop. When the second or adjacent wafer 52 is loaded into the pallet 56, the same lip 110 of the adjacent closed lid 102 acts as the stop which prevents the second wafer 52 from being placed to far forward within the pallet 56. The second lid 102 is then closed and the process of loading additional wafers within the pallet repeats itself. During this loading process, all of the wafers 52 are empty or void of terminals 54.

Figure 36:
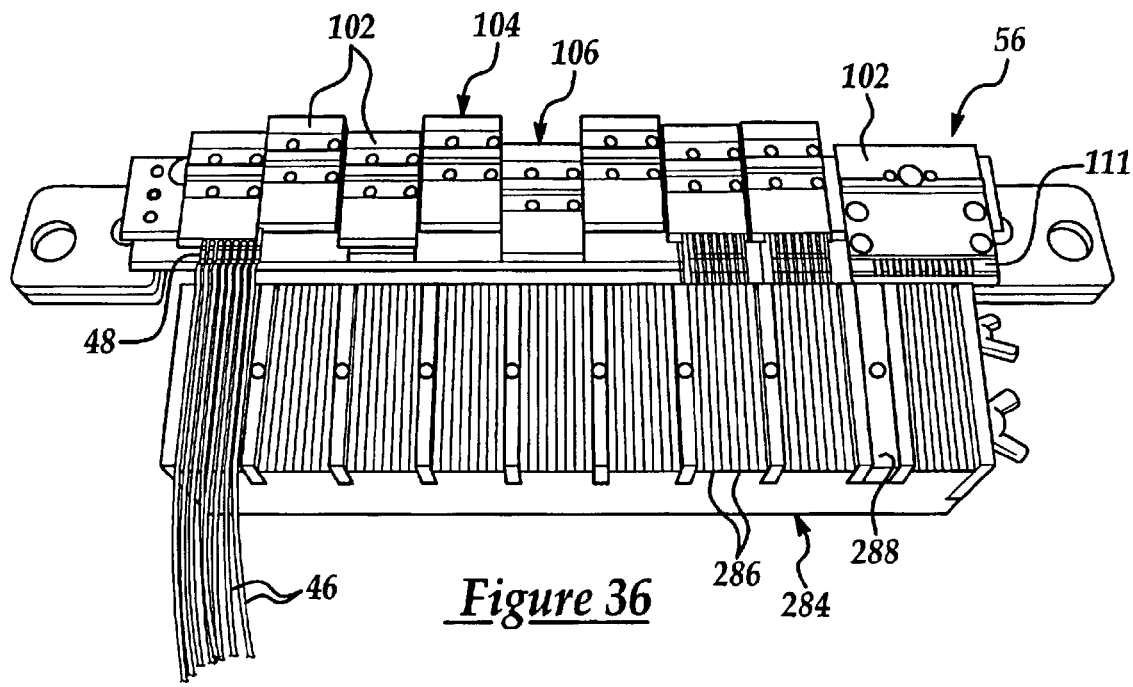
FIG. 36 is a perspective view of the pallet aligned to a tray of the wire marker station.
Figure 37:
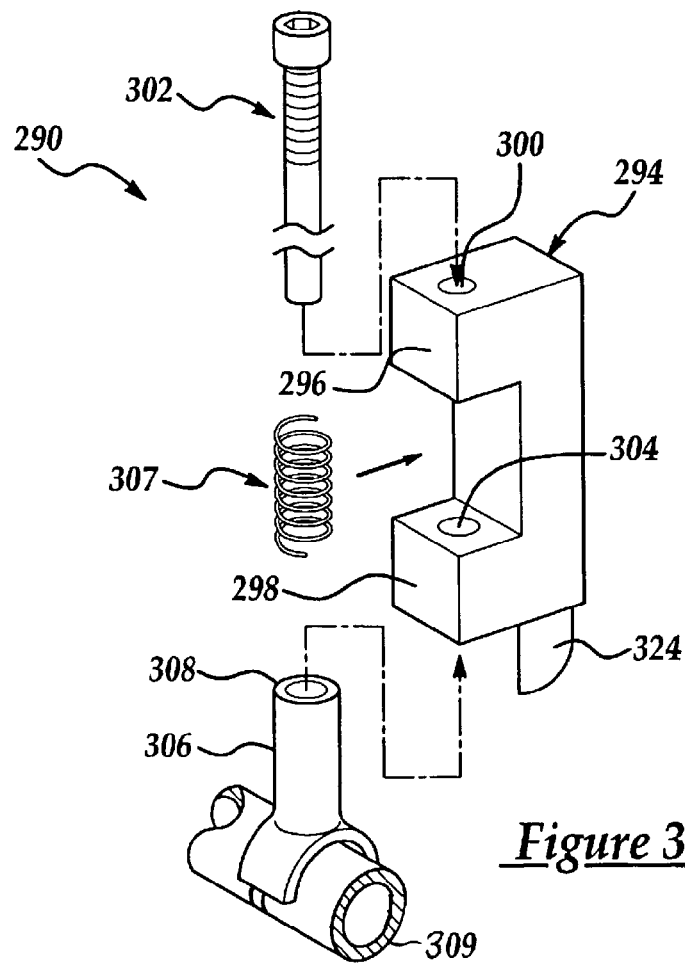
FIG. 37 is an exploded perspective view of a comb device of the wire marker.

Referring to FIG. 36, the pallet 56 includes an optional steel tool insert 111 illustrated at the end of the pallet to hold individual terminals 54 which are not seated within a wafer 52 but do require termination to a wire 46 of the wire harness 42. This is advantageous when using a single lead that is not carried by the connector 44 and instead mates directly to an adjacent electrical system.

It is currently anticipated that because of the varying structure of wafers 56 which could be placed into the pallet (i.e. varying number of terminal cavities), manual selection and placement into the pallet is more cost effective than automating it. However, if cost and efficiency are ever proven otherwise, automating the loading of the pallet 56 with the wafers 52 could be accomplished. Regardless, the pallet 56 is configured in anticipation of the components or wafers that are going in and thus the configuration would assure the proper wafer is loaded into the proper location of the pallet. The pre-configuration is necessary to stop axial or longitudinal slide of the wafer 52 with respect to the pallet 56. Even when the lid is closed and has engaged the wafer in a fairly firm interference fit, smaller wafers could still slide axially if the pallet is not reconfigured. The lid 102 of the pallet 56 dictates the size and placement of the wafers 52 in the pallet 56. The lids 102 are constructed and arranged to be disassembled from the body 76 of the pallet and replaced with lids of different sizes to handle different size or width wafers.

The Terminal Inserter:

Referring to FIGS. 12–16, with all the necessary wafers 52 loaded into the pallet 56, the conveyor 58 moves the loaded pallet 56 forward to the terminal inserter or inserter station 64. The terminal inserter cuts each preformed terminal 54 from a coiled carrier strip 112 and inserts each terminal 54, along a substantially horizontal imaginary plane, into each required terminal slot or elongated cavity 114 defined by the wafer 52. A vertical moving head 116 of the terminal inserter 64 positions, holds, and shears the terminals 54 individually away from the carrier strip 112. The linear motion of the head 116 is derived or translated from rotational motion of a servo motor 118 via a gearbox 120. Once cut, a rigid pusher 122 of the inserter 64 pushes the terminal into the terminal cavity 114 of the wafer 52. The pusher 122 moves via a pneumatic cylinder or servo motor 124 which delivers sufficient force so that the terminals 54 lock within their respective cavities 114. The novel features of the terminals and how the terminals lock into the wafer 52 are described in-part in parent U.S. Pat. No. 6,588,646 (co-pending U.S. patent application Ser. No. 09/993,797), incorporated herein by reference, and will be further described later within this specification.

Figure 12:
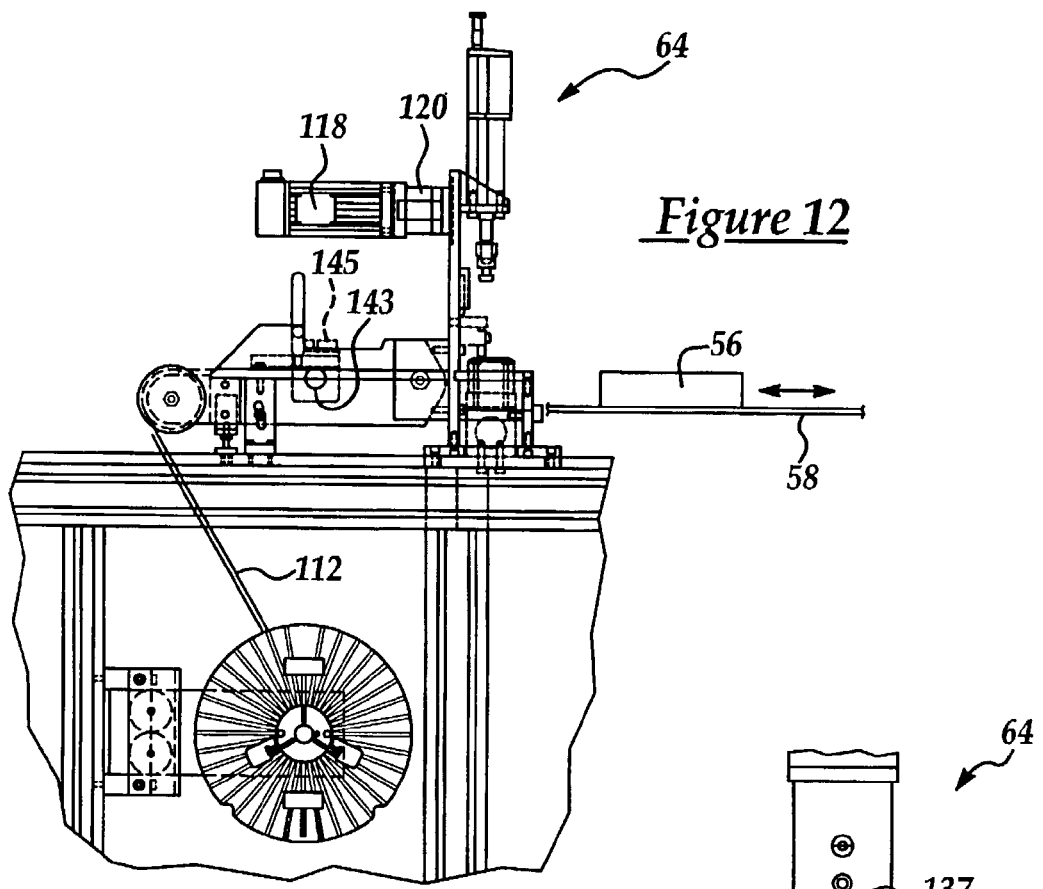
FIG. 12 is a front view of a terminal inserter station of the wire harness manufacturing machine.
Figure 13:
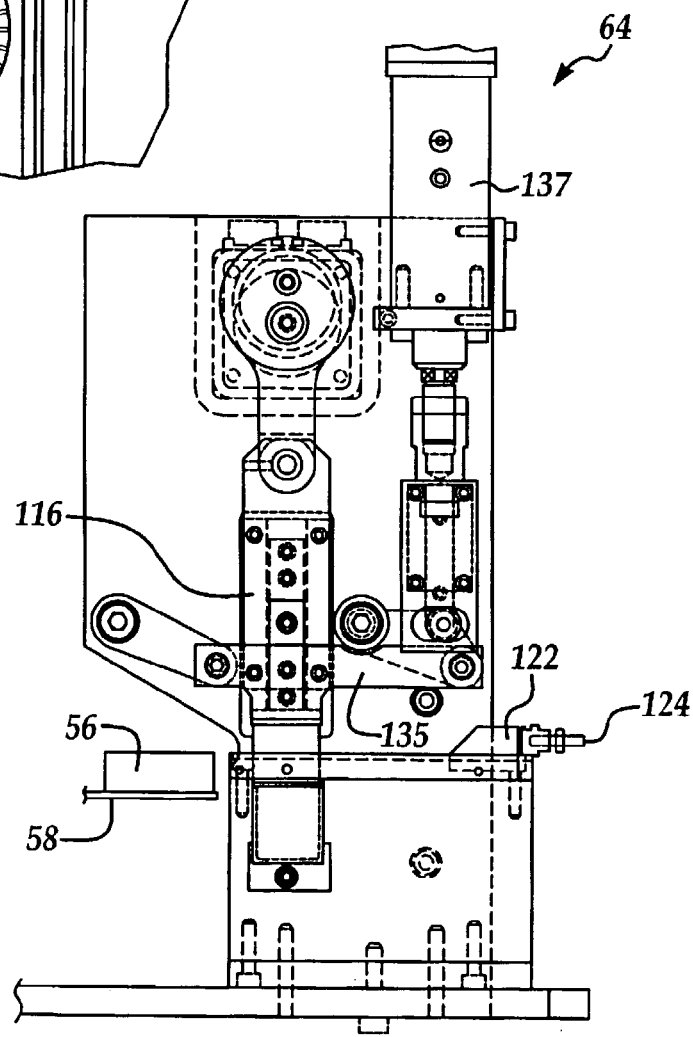
FIG. 13 is a side view of the terminal inserter station.
Figure 15A:
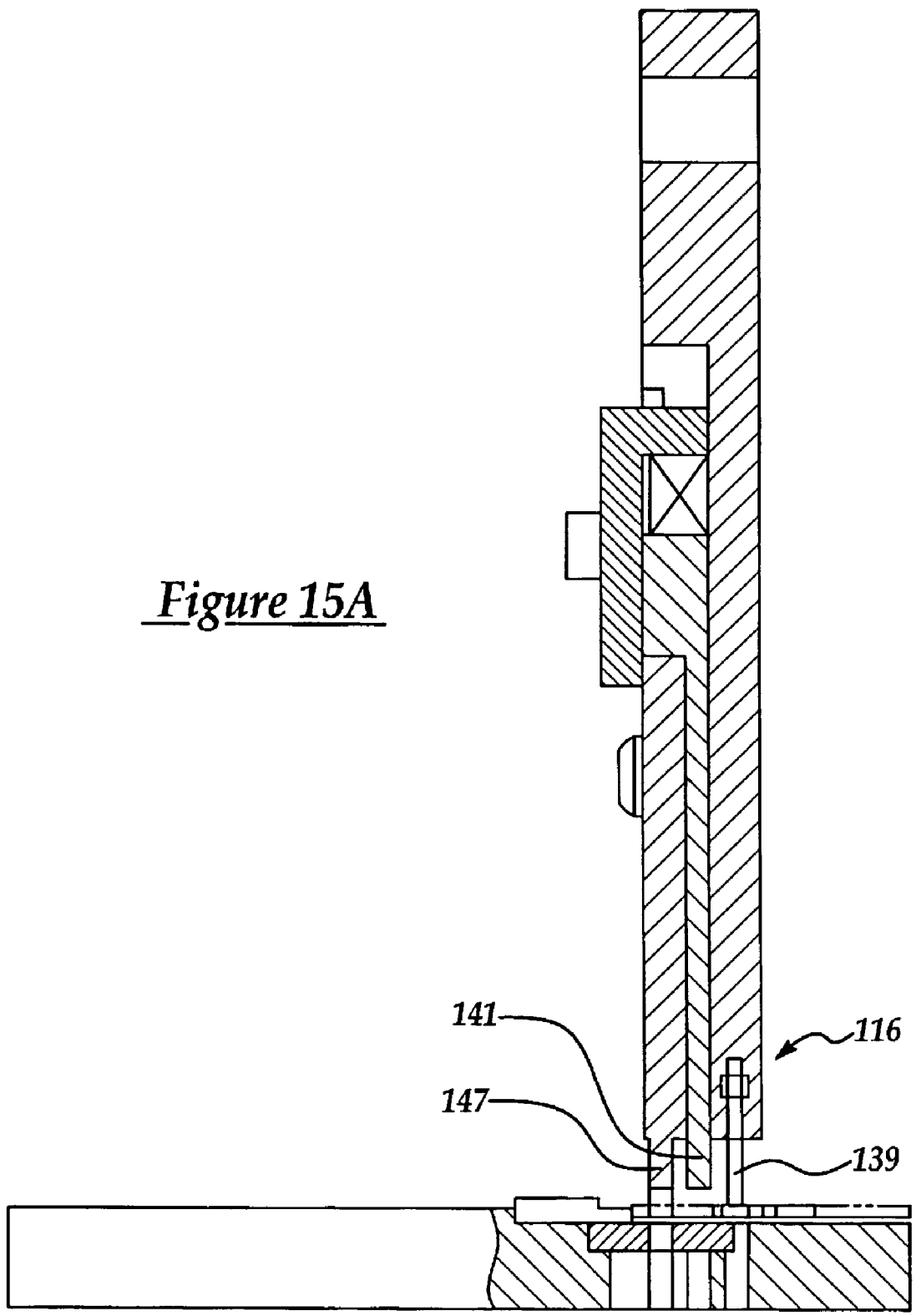
FIG. 15A is a cross section of a head of the terminal inserter station.
Figure 16:
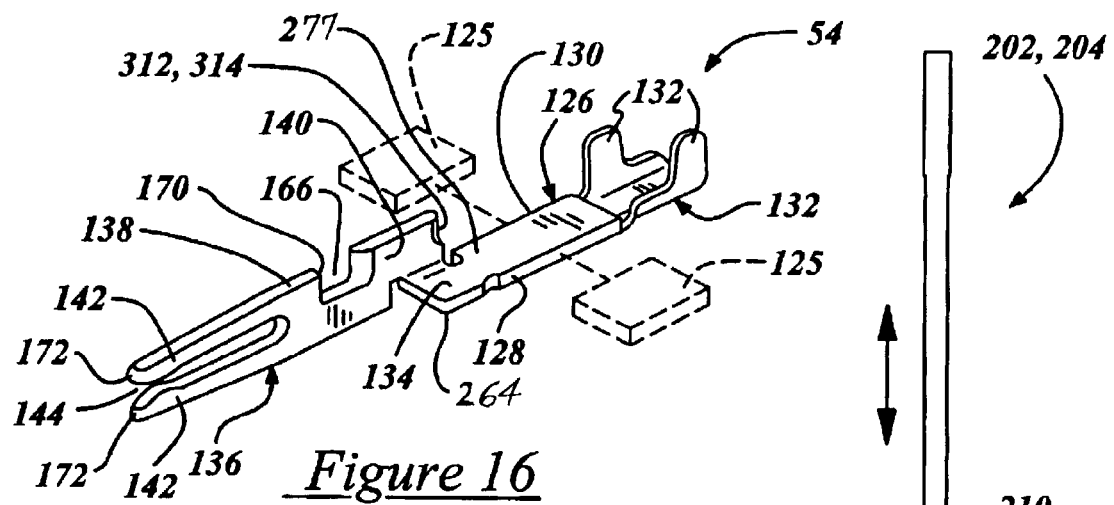
FIG. 16 is a perspective view of a terminal of the electrical connector.
Figure 25:
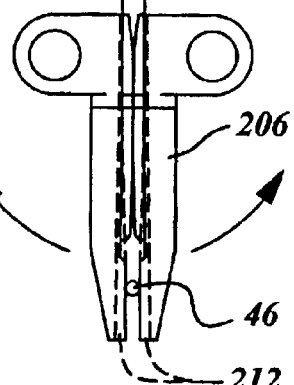
FIG. 25 is a front view of the crimp device show engaged to the wire.
Figure 17:
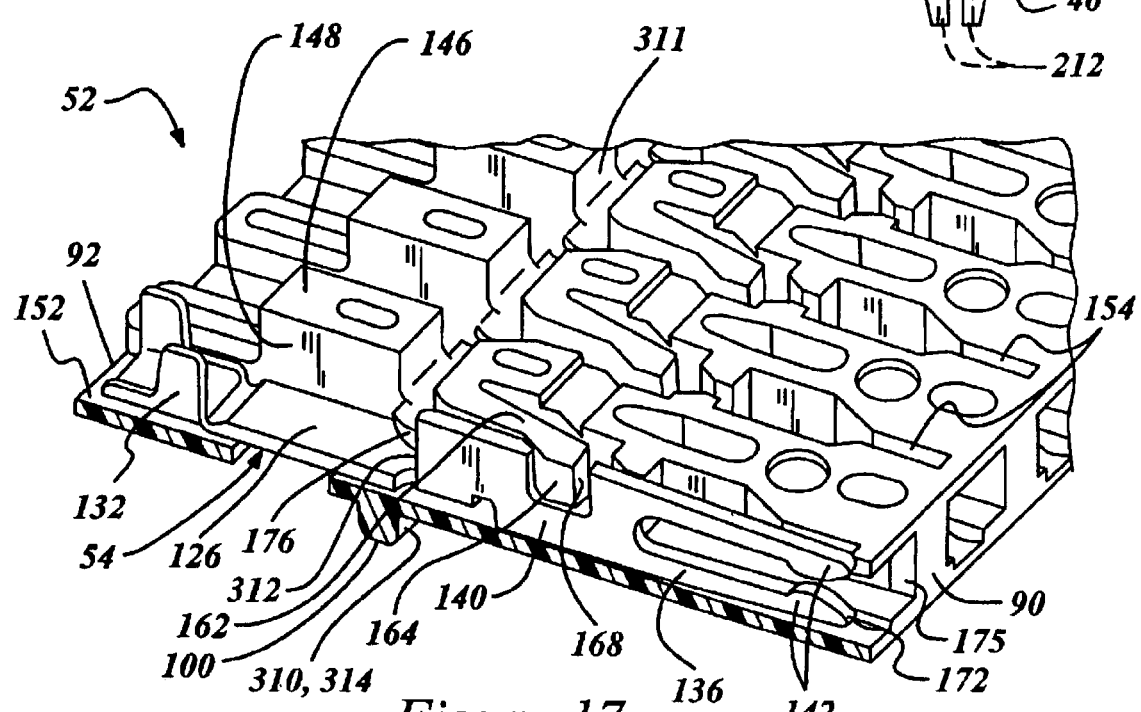
FIG. 17 is a perspective view of a wafer assembly of the electrical connector with portions cut-away to show internal detail.

Referring to FIGS. 12 and 16, the elongated terminals 54 are engaged to one another via the terminal strip 112, or more specifically, via a series of strip blanks or slugs 125 engaged unitarily to and interposed by the base portions 126 of the terminals 54. When the terminals 54 are contained within the coiled form, each base portion 126 has a first longitudinal edge 128 engaged to one strip blank and a substantially parallel and opposite second longitudinal edge 130 engaged unitarily to the next strip blank. Or, in other words, each respective strip blank 125, prior to being cut away by the terminal inserter 64, is engaged contiguously between the first edge 128 of a terminal 54 and the second edge 130 of the next adjacent terminal 54.

Extending longitudinally outward from one end of the elongated base portion 126 is a crimping portion 132 of the terminal 54. The crimping portion has a pair of crimp wings 133 disposed generally perpendicular to the base portion 126 and extending upward when the terminal 54 is in the pre-formed and un-crimped state. One wing 133 projects generally upward from the first edge 128 and the other wing 132 projects upward from the second edge 130. The wings 133 are offset from one another longitudinally along the terminal.

The opposite end of the base portion 126 is essentially a rigid support flap 134 which is substantially co-planar to the remainder of the base portion. A receptacle or tuning-fork portion 136 of the terminal 54 projects generally longitudinally outward from the flap 134. Although the fork portion 136 is substantially aligned parallel to the base portion 126, the fork portion 136 substantially lies within an imaginary vertical plane and projects laterally upward from the second edge 130 at the flap 134 of the base portion 126 and to an uppermost top edge 138 of the fork portion 136. A substantially vertical elongated plate 140 of the tuning-fork portion 136 extends longitudinally with respect to the terminal 54 and is engaged unitarily between the second edge 130 at the flap 134 and a pair of elongated substantially parallel prongs 142. The space directly between the prongs 142 defines a slot or receptacle 144 which receives the electrically conductive pin or blade of a mating connector (not shown). The uppermost prong 142 carries the uppermost top edge 138 of the terminal 54.

Referring back to the terminal inserter 64; when in operation, the conveyor 58, via the controller 75, moves the loaded pallet 56 and wafers 52 to the terminal inserter 64. The controller 75 signals which cavity 114 of which wafer is to receive a terminal 54 and the respective cavity 114 is thus placed in front of the plunger 122 for receiving the terminal 54. During this time, the head 116 is performing a single cycle, wherein the coiled carrier strip 112 is advanced one terminal 54 and one carrier strip slug 125 via a pronged indexing wheel 143 which rotates via a servo motor. As previously described, each blank 125 is engaged laterally between adjacent terminals 54. A terminal guide bar 135 swings downward via a precision actuator or servo motor 137 to engage and maintain the vertical orientation of the distal terminal 54 of the coiled carrier strip 112. The head 116 moves downward horizontally positioning the carrier strip 112 with a downward projecting pilot pin 139 which extends through a pilot hole of the slug 125. In the same downward movement of the head 116, the carrier strip 112 is held downward via a spring loaded pressure pad 141 which directly engages the slug 125. As a final step of the downward movement of the head 116, a downward projecting punch 14. As a final step of the downward movement of the head 116, a downward projecting punch 147 of the head 116 shears off the slug 125 from the adjacent terminal and pushes the slug through a shear hole or die (not shown) of the terminal inserter. By shearing the slug 125 away from the base portion 126 of the adjacent terminals 54, the first and second edges 128, 130 of the terminal base portions 126 are formed.

The terminal 54 at the free end of the coiled carrier strip 112 is thus freed it is positioned in front of the horizontal plunger 122. The head 116 then moves upward back to its initial position as the plunger 122 engages the crimping portion 132 of the terminal 54 and inserts the terminal into the wafer 52. By way of the controller 75, the conveyor 58 indexes forward to the next wafer cavity 114 designated to receive a terminal 54 while the coiled carrier strip 112 simultaneously advances for the next terminal cutting, and hence the cycle repeats itself.

Although not shown, the terminal inserter 64 may include an automatic detect mechanism which could detect which lid location of the pallet 56 actually has a wafer 52 mounted therein. That is, if along the pallet 56, a wafer 52 is not inserted, the terminal inserter 64 will skip that wafer location of the pallet 56 and move on to the next. This can be done with machine vision technology, or could be done with an insertion force detector so that when the inserter 64 thinks its inserting, if it does not experience any resistive forces otherwise produced by locking features of the absent wafer it will not insert the terminal at that location.

Because the height of the terminal 54 is slightly less than the depth of the terminal cavity 114, the lid 102 of the pallet 56 snugly engages the wafer 52 but is spaced slightly above the top edge 138 of the tuning-fork portion 136 of the terminal 54. Therefore, attributes of the wafer 52, and not the lid itself, are relied upon to hold the terminal 54 vertically within the wafer 52 as the pallet 56 progresses through the manufacturing process. Because of this clearance, the terminal 54 does not engage or experience frictional resistance from the lid 102 during the terminal insertion process. If it were to experience such resistance, the lid could potentially move to the open position 104 thus releasing the wafer or causing damage to the terminal 54 itself.

Referring to FIGS. 5–9 and 18–19, the elongated terminal cavities 114 of each wafer 52 are separated by a wall 146. Each cavity 114 is defined by a first side 148 of a wall, a second side 150 of the next adjacent wall 146 and a cavity floor 152 which spans laterally between the first and second sides 148, 150. Each cavity has a furrow 154 which terminates at the receiving end face 90 of the wafer 52, and a communicating vestibule 156 which terminates at the end face 92 of the wafer 52. The furrow 154 snugly holds the generally vertical tuning-fork portion 136 of the terminal 54 and the vestibule 156 holds the generally horizontal base and crimping portions 126, 132 of the terminal 54, therefore, the furrow 154 is appreciably narrower than the vestibule 156.

The multiple locking attributes between the wafer 52 and each terminal 54 includes a longitudinal or horizontal lock feature 158 and a lateral or vertical lock feature 160 which engage mating features of the terminal when the terminal 54 is initially inserted into the wafer 52 via the terminal inserter 64. The longitudinal lock feature 158 prevents the terminal 54 from backing out of the wafer 52 after insertion, and the lateral lock feature 160 prevents the terminal 52 from lifting upward and out of the vestibule 156 of the cavity 114.

Figure 19:
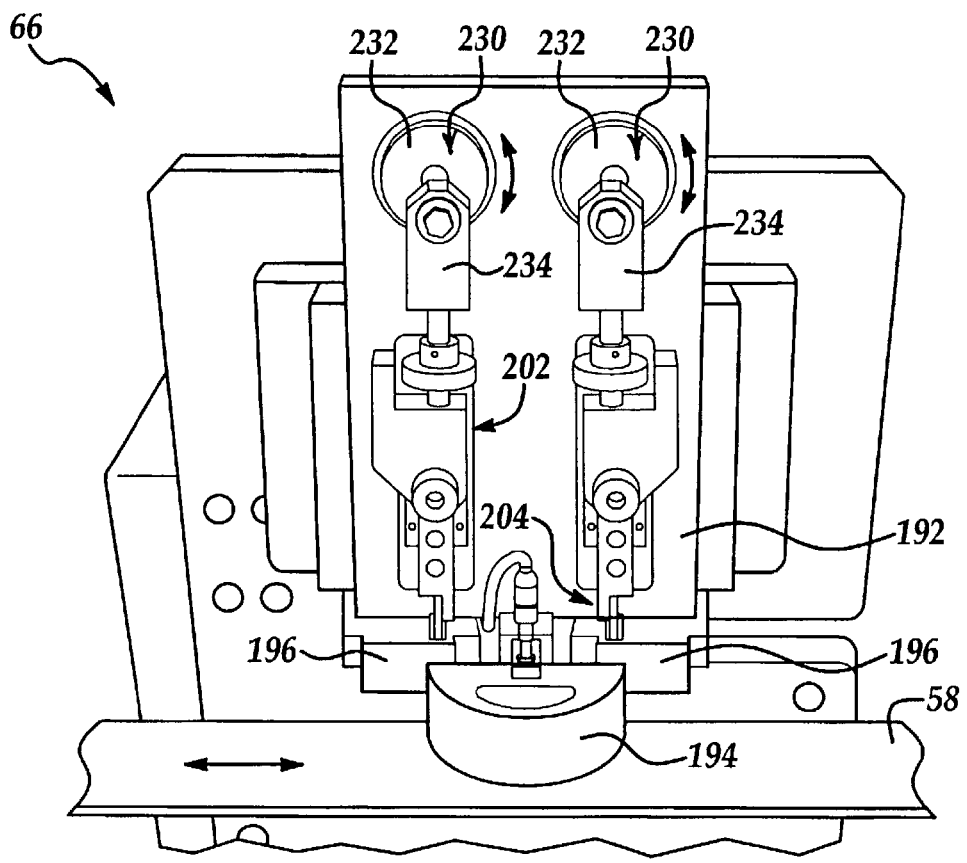
FIG. 19 is a perspective front view of a wire loader station of the wire harness manufacturing machine.

The longitudinal lock feature 158 has a resilient arm 162 which projects unitarily outward from the first side 148 substantially between the furrow 154 and the vestibule 156 of the cavity 114. The arm 162 projects at an angle longitudinally into the furrow 154 and laterally across it toward the second side 150. During insertion of the terminal 54 into the wafer 52, the prongs 142 of the of the tuning fork portion 136 of the terminal 54 engages a ramped or enlarged distal head 164 of the arm 162 causing the head 164 and arm 162 to flex toward the fist side 148. The head 164 slides directly against the longitudinal side of the prongs 142 and against the plate 140 of the terminal 54 until the head resiliently snaps into a notch 166 carried by the plate 140 and which communicates through the top edge 138 of the fork portion 136 of the terminal 52, as best shown in FIG. 19. The arm 162 and the head 164 are spaced slightly above the cavity floor 152 so that the rigid flap 134 of the base portion 126 of the terminal 54 can slide in-part beneath the arm 162.

Figure 18:
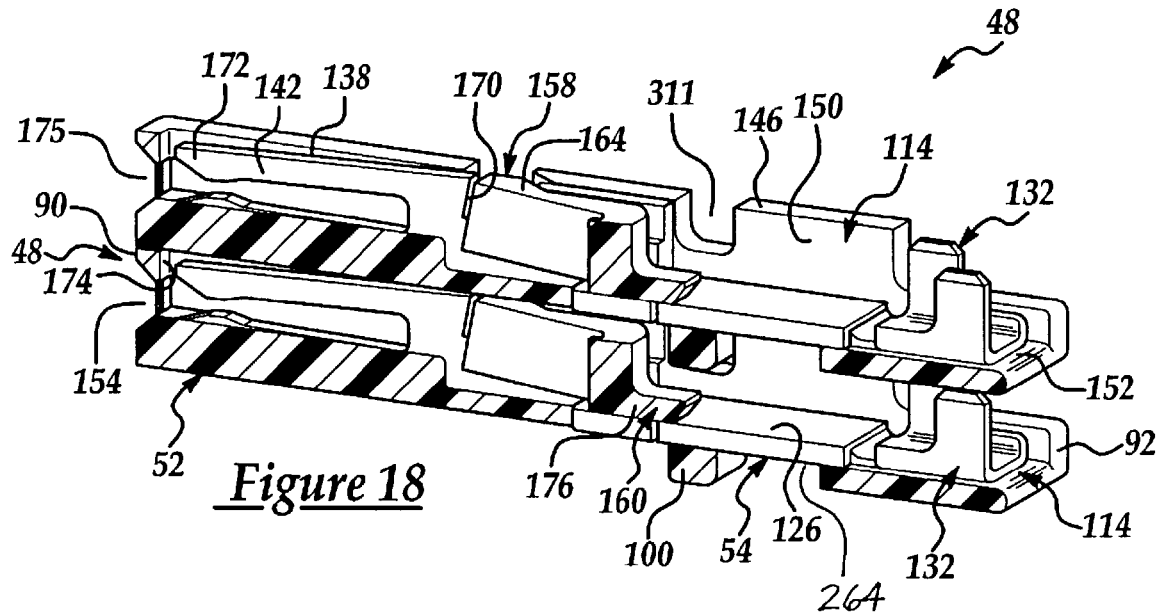
FIG. 18 is a perspective view of two wafer assemblies of the electrical connector shown stacked together and with portions removed to show internal detail.

Referring to FIGS. 18–19, the head 164 has a forward stop face 168 which engages a rearward edge surface 170 which in-part defines the notch 166 to prevent the terminal from backing out of the cavity 114. The terminal 54 is prevented from moving or inserting too far into the cavity 115 via contact between tips 172 of each prong 142 and a shelf 174 carried by the wafer 52 at the receiving end face 90. The shelf 174 also defines a beveled blade or pin aperture 175 carried by the receiving end face 90 of the wafer 52 which communicates with the furrow 154, as best shown in FIG. 9, and receives the pin of the mating connector, not shown.

Referring to FIGS. 6 and 18, the lateral lock feature 160 has a ledge 176 which projects unitarily outward from the first side 148 and into the vestibule 152 of the cavity 114 and near the furrow 154. Both the ledge 176 and the resilient arm 162 are elevated upward, or spaced, from the cavity floor 152. For additional rigidity, the ledge 176 also projects laterally and unitarily outward and rearward from the arm 162. The ledge 176 is disposed substantially parallel to the cavity floor 152, so that insertion of the terminal 54 into the cavity 114 causes the rigid flap 134 of the base portion 126 of the terminal 54 to slide snugly under the ledge 176. In other words, because the spacing between the ledge 176 and the cavity floor 152 is substantially equal to the thickness of the base portion 126 of the terminal, the terminal is prevented from lifting upward out of the vestibule 152.

In operation, with the terminals 54 locked within the pre-designated cavities 114 of the wafers 52, the pallet 56 advances to the next process via the conveyor 58 and controller 75.

The Wire Loader:

Referring to FIGS. 1 and 19–27, the next stage is the wire loader or loader station 66 which is constructed and arranged to draw wire 46 under a constant tension from a plurality of drums or dispensers 176. The wire loader 66 measures each wire to a predetermined length, cuts the wire, places it, longitudinally perforates an insulation jacket 178 at each end of the wire to assist sonic welding, and crimps each end of the wire 46 to a respective terminal 54. The flexibility of the wire loader 66 can deliver up to twelve different cables or wires with four or more different gauge sizes ranging from 0.13 square millimeters to 0.80 square millimeters and having solid or stranded conductive cores. The wire loader 66 feeds the wires 46 out to a pre-established length based on program software within the controller 75. It cuts and places the wire 46 in a predetermined assigned vestibule 156 of the terminal cavity 114 of the wafer assembly 48. These are the same cavities 114 where the terminals 54 have been previously placed, so the wires 46 are actually inserted only into the wafer cavities 114 that have a terminal 54. This is to be distinguished with conventional practices which typically place a terminal in every cavity of the electrical connector, whether ultimately used or not. The automated capability of the present process avoids the need to load terminals 54 into cavities 114 where they are not needed for the final wire harness 42.

Figure 20:
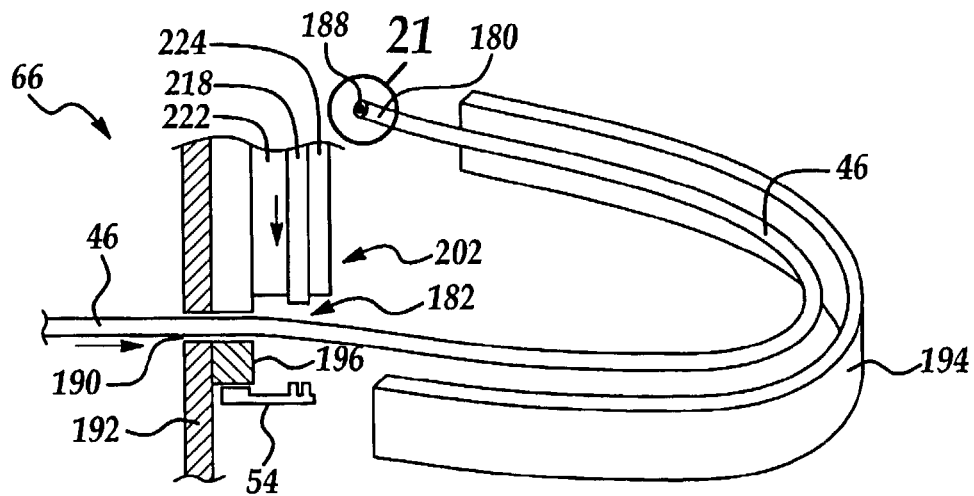
FIG. 20 is a fragmented perspective view of a frame, crimp device and housing of the wire loader station.
Figure 21:
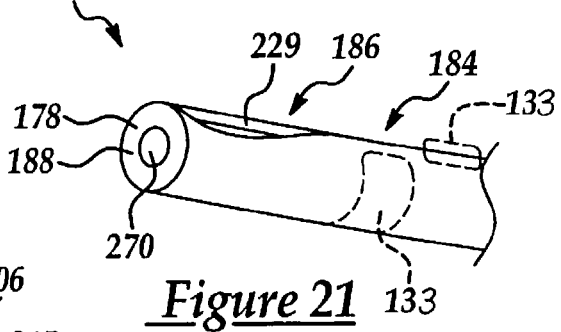
FIG. 21 is an enlarged perspective view of a distal end of a wire of the electrical connector.
Figure 22:
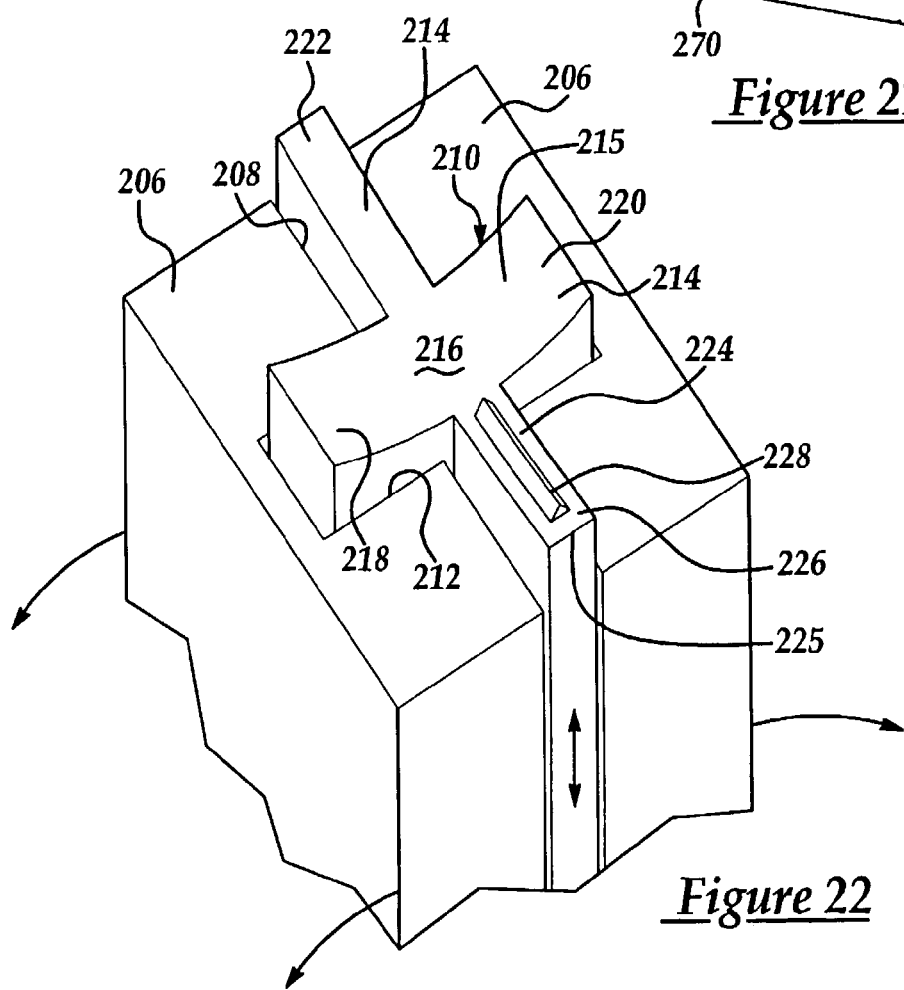
FIG. 22 is an enlarged bottom perspective view of the crimp device of the wire loader station.

Referring to FIGS. 20 and 21, each length of wire 46 has a distal end portion 180 and a cut end portion 182. Each of the end portions 180, 182 have a crimp segment 184 which extends longitudinally to a projecting distal weld segment 186. The weld segment 186 carries a traversing cut-off surface 188 wherein the electrically conductive core of the wire 46 is exposed and disposed substantially concentrically and radially inward from the insulating jacket 178.

Figures 23, 24:
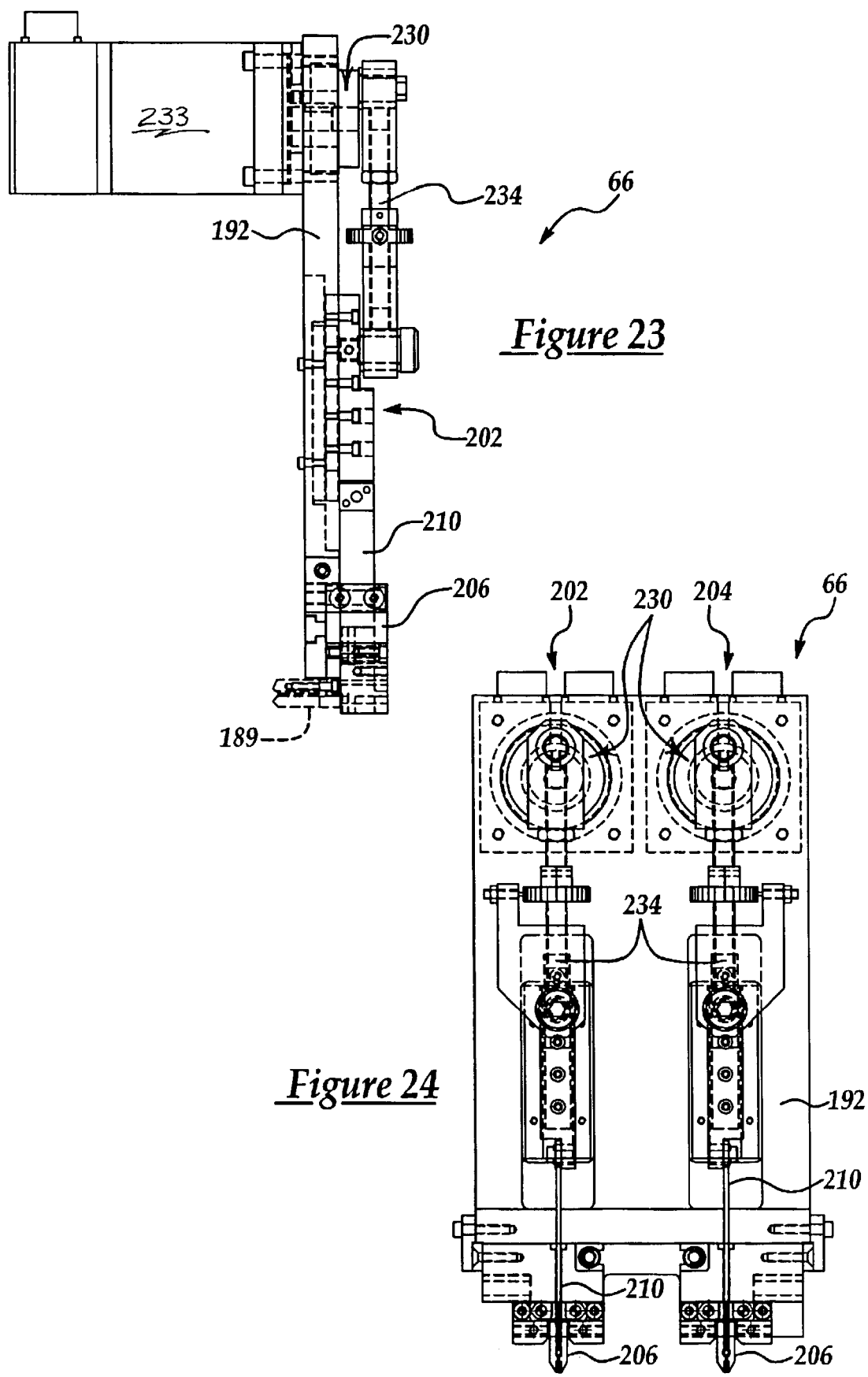
FIG. 23 a side view of the wire loader station.
FIG. 24 is a front view of the wire loader station.
Figure 27:
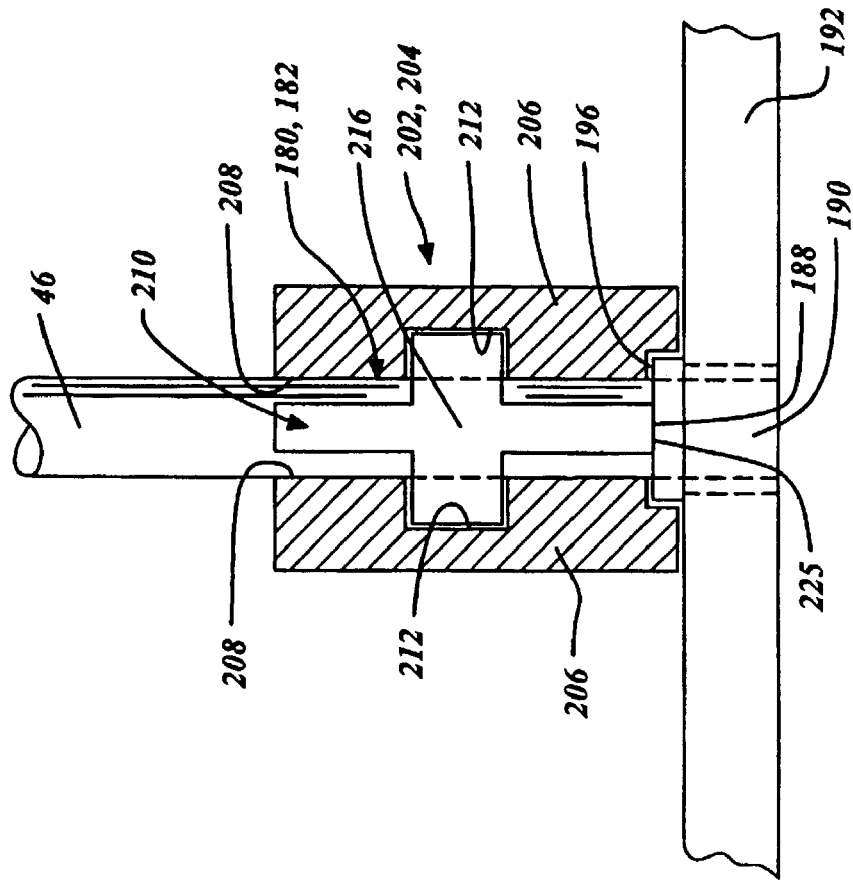
FIG. 27 is a top view of the crimp device with portions cut-away to show internal detail.
Figure 26:
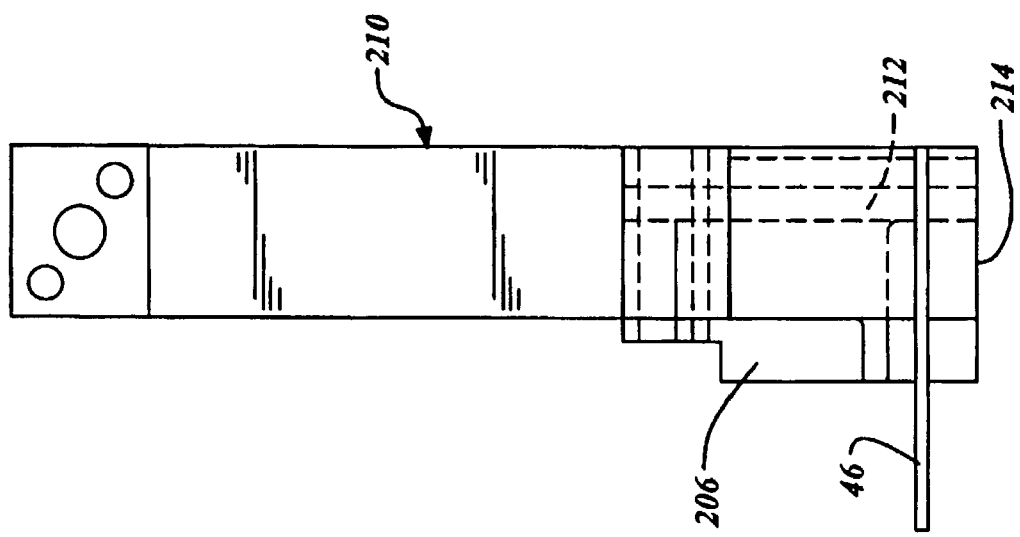
FIG. 26 is a side view of the crimp device.
Figure 28:
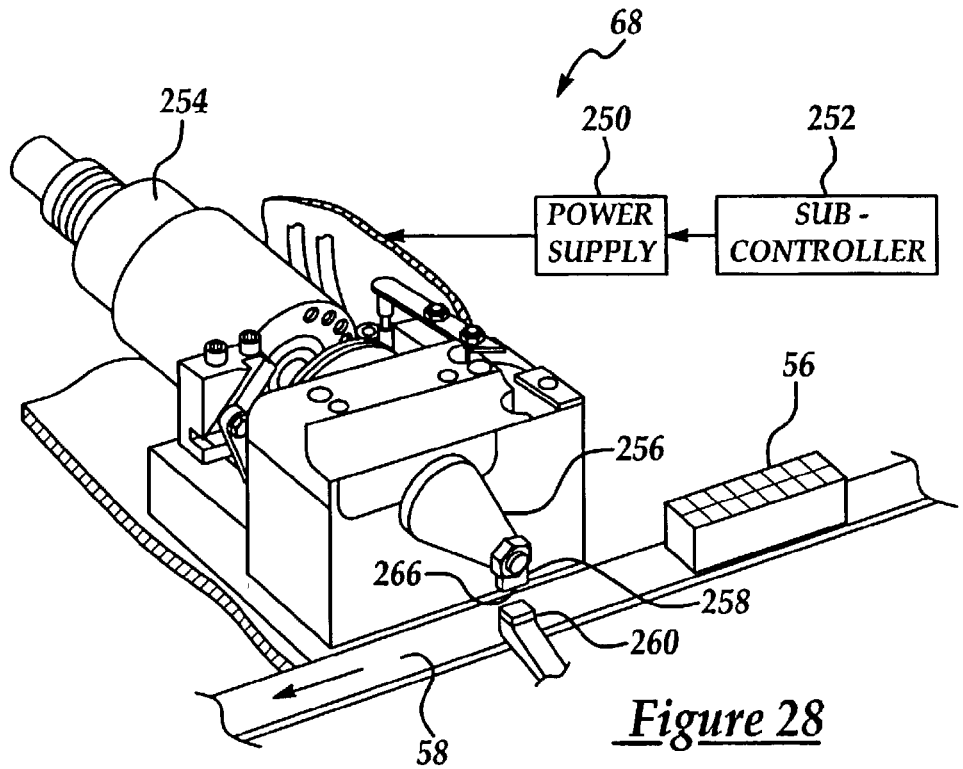
FIG. 28 is a perspective view of an ultrasonic welder station of the wire harness manufacturing machine.
Figure 29:
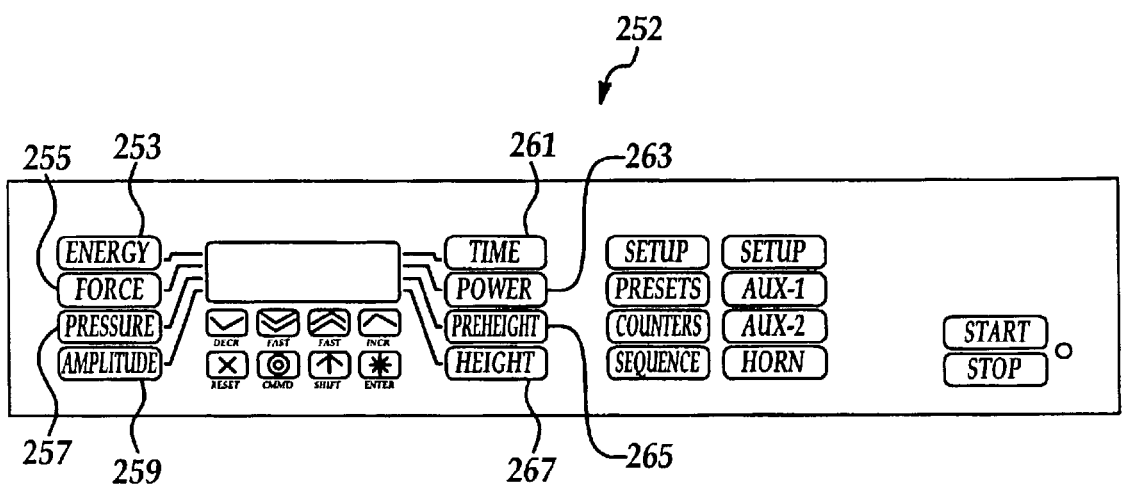
FIG. 29 is a front view of a sub-controller of the ultrasonic welder station.

Referring to FIG. 23, a cable track mechanism 189 is constructed and arranged to stage up to twelve wires and can move the wires from side-to-side relative to a stationary frame 192 of the loader 66 aligning each wire for feeding when required.

The wire 46 feeds through a single port 190 carried by the stationary frame 192 of the loader 66 and is guided within a semi-circular concave surface of a housing or basket 194 looping the wire around until the cutoff surface 188 of the distal end portion 180 of the wire 46 butts against a substantially vertical planar indexing surface or block 196 engaged rigidly to the frame 192. The indexing surface 196 co-extends longitudinally with the conveyor 58 and also serves as a cutting surface or cutting block for the cut-off end portion 182 of the wire 46. Consequently, the indexing surface 196 of the loader 66 simultaneously aligns the cut-off surfaces 188 for both end portions 180, 182 vertically above and longitudinally to the base portion 126 of the terminal 54 within the vestibule 156 of the wafer cavity 114. At this point, the crimp segment 184 of the wire end portion 182 is aligned longitudinally and vertically above the crimping portion 132 of the respective terminal 54 and the weld segment 186 is aligned longitudinally and vertically above the base portion 126 of the same terminal 54.

The opposite end portion 180 of the wire 46 which was looped back and has butted against the indexing surface 196 is aligned longitudinally to the terminals held within the pallet 56 but is not yet directly above the terminal 54 to which it will be crimped. It is only after the crimp segment 184 of the end portion 182 is crimped that the conveyor 58 will move in a forward or reverse direction, via the controller 75, to align the respective terminal 54 directly under the end portion 180, at which point the end portion 180 is lowered and crimped to the second terminal.

With respect to the wafer 52, the cut-off surfaces 188 of the wire end portions 180, 182 are aligned vertically and disposed slightly horizontally or longitudinally away from the ledge 174 of the lateral lock feature 160, via the cutting block 196. This is necessary to prevent the insulation jacket 178 of the wire 46 from flowing into the ledge 174 are during the weld process which could interfer with the stacking of the wafers during final assembly of the connector 44.

In operation, the distal end portion 180 embarks upon the concave guide surface of the horse-shoe housing 194 as the wire 46 feeds through the port 190. Once the cut-off surface 188 of the distal end portion 180 of the wire 46 contacts the indexing surface 196 of the cutting block, the otherwise obstructing horse-shoe housing 194 is moved mechanically upward, permitting any remaining length of wire to be fed through the port 190. A vertical moving crimp device 202 then grips the cut-off end portion 182, and a second vertical moving crimp device 204 simultaneously grips the distal end portion 180 of the same wire 46. Preferably, the conveyor 58 pre-aligns the terminal 54 under the first crimp device 202 in preparation for loading the cut-off end portion 182 of the wire 46 before the cycle of the wire loader 66 begins. Once gripped, the cut-off end portion 182 is loaded into the terminal and crimped by the crimp device 202.

After the cut-off end portion 182 is loaded and crimped, the conveyor 58 either advances or reverses to align the second crimp device 204 to the second terminal 54 for loading and crimping of the distal end portion 180 of the wire. It should be apparent that which ever end portion 180, 182 is aligned to the respective terminal 54 first, and thus crimped first, can be easily reversed. Moreover, as a design alternative, the second crimp device 204 can be constructed and arranged to move along the stationary conveyor 58 instead. That is, the conveyor need not move prior to loading of the second or distal end portion 180 of the wire 46, instead, the second crimp device 204 can move to the terminal to be crimped. However, for the sake of design simplicity and cost, backward or forward movement of the conveyor 58, as illustrated in FIG. 19, is the preferred alternative.

Both crimp devices 202, 204 are substantially identical but operate independently from one another and in coordination with the conveyor 58. Each device 202, 204 has a pair of opposing and pivoting grippers 206 each having inward faces 208 constructed and arranged to pivot inward toward one-another to laterally engage the respective end portions 180, 182 of the wire 46. Each gripper has a ball-spring-pin arrangement (not shown) to bias the grippers in a closed position or against the wire.

Referring to FIGS. 19 and 25–27, once both ends 180, 182 are gripped, or simultaneously thereto, the conveyor 58 moves the pallet 56 in a forward or reverse direction so that a pre-determined terminal 54 is aligned under the distal end portion 180 of the wire 46. A vertical moving rod or plunger 210 of the crimp device 202 moves downward and is guided within opposing vertical channels 212 carried by the inward faces 208 of the grippers 206 engaged pivotally to the frame 192. A distal, multi-functional contact face 214 of the plunger 210 makes direct contact with the insulation jacket 178 at the weld and crimp segments 186, 184 of the end portion 180. The face 214 engages the jacket 178 and moves the end portion 180 of the wire 46 downward, thus sliding the wire 46 against the inward faces 208 of the grippers 206 disposed immediately above the vestibule 156 of the wafer cavity 114. Continued downward movement of the plunger 210 releases the wire 46 from the grippers 206 and places the end portion 180 directly into the terminal 54. Further downward movement causes a concave crimp quadrant 215 of the contact face 214 to engage the crimp wings 133 of the terminal 54, bending the wings toward one another and firmly about the insulation jacket 178 at the crimp segment 184 of the wire 46.

Referring to FIGS. 22 and 25–27, the plunger 210 has a generally T-shaped cross section formed by a four-sided elongated mid-section 216 and a first, second, third, and fourth leg 218, 220, 222, 224 extending contiguously in four respective directions from each side of the mid-section. The first and second legs 218, 220 project in opposite directions from the mid-section 216 and into respective channels 212 of the grippers 206 to guide the plunger vertically. The channels 212 are preferably deeper than the projecting distance of the first and second legs 218, 220 enabling the grippers 206 to collapse fully inward to grip the smaller gauge wires 46. The third and fourth legs 222, 224 project from one another in opposite directions from the mid-section 216 and are disposed substantially perpendicular to the first and second legs 218, 220. Both the third and fourth legs 222, 224 lie within an imaginary plane disposed substantially perpendicular to the imaginary plane of the first and second legs 218, 220 and are generally parallel to the longitude of the wire 46 at the end portions 180, 182.

The fourth leg 224 projects from the mid-section 216 to a vertical cutting edge 225. The cutting edge 225 is aligned above and very near to the indexing surface or cutter block 196. Cutting of the wire 46 is accomplish via a scissors effect wherein the cutting edge 225 of the plunger 210 passes very close to the cutting block 196 during its downward movement, thereby tearing the wire. The projecting length of the fourth leg 224 is generally equal to the length of the weld segment 186 of the end portions 180, 182.

An imprint portion 226 of the contact face 214 which is carried by the end of the fourth leg 224 has a longitudinal rib or elongated peak 228 designed to create an imprint or split 229 into the jacket 178 at the weld segment 186. Because it is preferable not to split the jacket 178 through the cut-off face 188 of the end portions 180, 182, the elongated peak 228 does not extend all the way to the end or cutting edge 225 of the fourth leg 224. This prevents the jacket 178 from being cut through to the cut-off face 188. Otherwise, during the welding process, melting flow of the jacket 178 would be less controlled and could spill over into undesirable areas of the terminal 54, such as the ledge 176 area which would hinder stacking of the wafer assemblies 48 during final assembly of the connector 44.

The crimp quadrant 215 of the contact face 214 is disposed substantially perpendicular to the projection of the imprint portion 226, and is carried by the ends of the mid section 216, the first leg 218 and the second leg 220. During crimping, each of the two upward projecting un-crimped wings 133 of the terminal 54 initially engage respective ends of the first and second legs 218, 220. The concave shape of the crimp quadrant 215 compel the wings 133 to bend inward toward one-another to grip the insulation jacket 178 at the crimp segment 184 of the wire 46. The distance the plunger 210 moves downward directly impacts the force placed upon the crimp segment 184 and dictated by the gauge of wire 46 being crimped, known and controlled via the controller 75. The first and second legs 218, 220 need not extend the entire vertical length of the plunger 110, but do extend far enough to be reliably guided within the channels 212 of the grippers 206 without binding.

Thus in a single stroke of the wire loader 66, there are four separate operations. The first operation is measuring and dispensing a desired length of wire 46 for given wafer assemblies 48, the second is cutting the wire 46 between the cutting edge 225 of the plunger 210 and the cutting block 196, the third is placing the wire end portions 180, 182 into the terminal base and crimping portions 126, 132, and the fourth is crimping the terminal wings 133 via the crimp quadrant 215 of the plunger 210. Referring to FIGS. 19, 23 and 24, all four operations are accomplished via a single stroke or cycle of a cam wheel mechanism 230 which drives the plunger 210 of the crimp devices 202, 204. Rotation of a wheel 232 of the wheel mechanism 230 causes a cam arm 234 connected between the wheel 232 and the plunger 210 to generally pivot converting the rotational movement of the wheel to linear movement of the plunger. The degrees of rotation of the wheel 232 translates into the vertical displacement of the plunger 210. This displacement is automatically adjusted depending upon the gauge of wire being crimped. In any event, the wheel 232 rotates less than one hundred and eighty degrees via a reversible electric motor 233 as best shown in FIG. 23.

To achieve a maximum range of wire gauges for a single wafer application, the terminal 54 varies in gauge or thickness. That is, the crimping portion 132 of the terminal 54 is considerable thinner than the rest of the terminal. This thinner thickness of the crimping portion 132 permits crimping of larger gauge wires 46 within the limited space of the terminal and/or wafer cavity 114. Likewise, the greater required thickness of the tuning-fork portion 136 of the terminal 54 provides the necessary strength for reliable and repeatable mating of the electrical connection. With the large volume within the crimping portion 132 and the ability to finely adjust the vertical travel of the plunger 210, multiple wires 46 can be crimped to a single terminal 54. That is, the wire loader 66 essentially has variable press control giving the flexibility of having dynamic control over the crimp heights based on the cable/wire size and number. Of course a less preferred design would be to have a separate crimping device for each wire gauge size. In this alternative design, the wheel 232 can simply do a complete revolution, or three hundred and sixty degree movement of the wheel 232, for each stroke.

The Ultrasonic Welder:

Referring to FIGS. 1, 20 and 28–29, with a series of un-stripped insulated wires 46 looped and crimped at each end portion 180, 182 to respective predetermined terminals 54 disposed within the pallet 56, the pallet moves via the conveyor 58 and controller 75 to the ultrasonic welder or welder station 68. The ultrasonic welder 68 utilizes ultrasonic energy to join non-ferrous metal of the terminal 54 to the nonferrous metal or conductor core 270 of the wire 46. It should be understood that ultrasonic welding is not conventional welding wherein metals are heated and melted into each other, instead, mechanical vibration is used to mutually gall the contact surfaces of the terminal and wire conductor core 270 together. This galling results in contaminants, such as surface oxidation, to be displaced along with the insulation jacket 178 of the wire 46. The galling further causes the contact surfaces to be polished. As galling continues, the contact surfaces become intimate, whereupon atomic and molecular bonding occurs therebetween. The terminal 54 and the wire 46 are thereby bonded together with a weld-like efficacy.

Preferably, the welder 68 is an "Ultraweld 40" ultrasonic welder of AMTECH (American Technology, Inc.) of Milford, Conn. This class of commercially available ultrasonic welders include: a solid state power supply 250 which is user adjusted via the controller 75 which communicates with an interposed microprocessor based sub-controller 252 of the welder 68, a transducer where electrical energy of the power supply is converted into mechanical vibration and an amplitude booster 254 where the mechanical vibrations of the transducer are amplified, and an output tool in the form of a horn 256 which tunes the vibrations to a novel tip 258 specifically designed for the wire harness manufacturing machine 40.

A number of factors collectively determine the efficacy of the ultrasonic metal-to-metal surface bond, the major considerations being the amplitude of the vibration, the applied force and the time of application. The applied power (P) is defined by the amplitude (X) of vibration times the force (F) applied normal to the metal surfaces (P=FX), and the applied energy (E) is defined by the applied power (P) times the time (T) of application (E=PT). These variables are predetermined to achieve the most efficacious bond based upon the metals of the wire 46 and terminal 54.

Prior to operation of the ultrasonic welder 68, these operating values (i.e. amplitude, force and energy) must be entered into either the controller 75 or the welder sub-controller 252. The values are pre-established from empirical data previously taken which are further dependent upon many factors. These factors include but are not limited to: wire or core gauge thickness, insulation jacket 178 thickness, terminal base portion 126 thickness, and types of materials. Other parameters controlled or monitored via the sub-controller 252 include energy 253, force or trigger pressure 255 used during pre-height measurement, pressure 257, amplitude 259, time 261, power 263, pre-height 265, and height 267.

The operator enters energy 253 as opposed to time 261 or height 267 because empirical data has shown that better control of final product quality is achieved. Welding to height or time is less sensitive is less sensitive to the condition of the terminal and cable. For instance, a wire 46 with a missing strand welded to a given height does not provide the same weld quality as when all strands are present.

Trigger pressure 255 is used to compact the wire 46 on the terminal 54 for the purpose of measuring the pre-height 265 before welding for monitoring purposes. If this height does not fit a pre-established height range, a warning indication is provided wherein it is assumed that the wrong sized wire is being used, the wire is missing, the terminal is mis-positioned, etc. The trigger pressure 255 should be set within about ten pounds per square inch of the final weld pressure 257. If the pre-height is within the pre-established range the welder 68 will begin the weld process. For a typical weld, the process will take about 0.5 seconds.

In regards to weld pressure 257, the actual pressure required to produce a good weld when used in conjunction with energy 253 and amplitude 259. The pressure 257 that is set on the sub-controller 252 is applied to an air cylinder that will provide the clamping force of the horn's tip 258 on the wire 46 and terminal 54 combination. Knowing the size of an air cylinder of the welder 68 which exerts force between the tip and the area to be welded, and by calculation, a pounds per square inch force on the actual welded area can be calculated.

The amplitude 259 is read in microns and moves generally coplanar to the terminal and wire. Electrical energy is applied to a converter 251 of the welder 68 where a crystal like material is excited at its natural frequency. A typical frequency is about forty kilohertz. The minute vibrations are transferred through the acoustically designed tuned booster 254 and transferred along to the horn. The greater the voltage applied to the converter, the greater the amplitude.

The welder 68 has a series of quality control features which monitor the welding process. These monitoring features are generally adjustable, thus capable of controlling the number of rejected or non-conforming parts. The first monitoring feature is a time feature which monitors the actual time that ultrasonic energy is running. The feature time is not the full cycle time but is the actual weld time. This time is a good indication of the non-ferrous material quality and cleanliness. If the weld time exceeds a pre-established duration, it is a likely indication that contaminates exist. Oxides, or other contaminants are inherently slippery and do not allow the proper metal-to-metal friction necessary to produce the weld.

A second quality control feature is that of power which is similar to time because work done on the weld is equal to power times time. Therefore, a weld that draws minimal power binds non-ferrous metals that are more likely to contain higher levels of contaminants.

Aside from the pre-height feature previously discussed, a final height quality control feature measures the final height of the weld. Under typical welding scenario for a single wire, the variation in the final height should be about 0.1 millimeters. If the final weld height falls above this range, it is a warning indication of under welding most likely due to excess contamination. If the final weld height falls under this range, it is a warning indication that wire strands have escaped or have not been captured within the weld area and thus not included in the height reading.

During operation of the welder 68, the weld segment 186 of the crimped wire 46 and the base portion 126 of the terminal 54 are placed via the conveyor 58 directly between the tip 258 and a stationary anvil 260 of the welder 68. The tip 258 extends from above into the vestibule 156 of the wafer 52 and presses downward upon the insulating jacket 178 of the wire 46 at the weld segment 186. The anvil 260 of the welder 68 extends upward through a weld window 262 of the trailing portion 96 of the wafer 52 to directly contact a planar bottom surface or side 264 of the base portion 126 of the terminal 54. The weld window extends through the bottom face 82 and the cavity floor 152 of the wafer 52 to communicate with the vestibule 156 of the cavity 114.

In preparation for welding, the insulation jacket 178 at the weld segment 186 of the wire 46 need not be stripped, but preferably has an imprint or longitudinal slit 229, as previously described, to assist in the welding process. Because of the unique design of the anvil 260 and the tip 258 of the welder 68, the electrical conductor 270 of the wire 46 is not limited to a solid core or single strand, but can be utilized with multi-stranded conductor cores or copper material. The insulating jacket 178 which covers the conductor core 270 is of a meltable material such as thermoplastic, and preferably polyvinyl chloride or polyester. The terminal 54 is nonferrous and preferably of a metal substantially softer than the steel of the tip 258 and anvil 260.

Referring to FIGS. 30A–D, during operation of the ultrasonic welder 68, the tip 258 moves downward relative to the stationary anvil 260 during the weld process. Both the tip and the anvil have mutually facing or opposing work surfaces 266, 268, but only the anvil work surface 268 is knurled to grip the bottom surface 264 of the terminal 54 as the tip is forced toward the anvil. The tip work surface 266 is smooth to reduce the time necessary to displace the insulation jacket 178. The frequency may be fixed at twenty kHz, at forty kHz or at another frequency, or the frequency may be other than fixed. In any event, the pre-established frequency shall be such that a resonance frequency is not produced within the terminal 54 which could potentially damage or crack portions of the terminal including the tuning-fork shaped prongs 142.

The work surface 266 of the tip 258 is initially moved into forceful abutment with the insulation jacket 178 of the wire 46, wherein the insulation jacketed wire is sandwiched against a top surface or side 277 of the base portion 126 of the terminal 54. Simultaneously, the bottom surface 264 of the base portion 126 is forcefully abutted against the work surface 268 of the anvil 260 by pivot plate 271 which pivots about a pivot axis 273 disposed parallel to the conveyor 58. The pivot plate 271 is actuated via a pneumatic cylinder (not shown) which moves the pallet 56 from a tilt up position 279 to a tilt down or anvil engage position 275. As best shown in FIG. 30B, the pre-slit insulation jacket 178 is further dimpled or deformed by the smooth work surface 266 of the tip 258, but not necessarily broken. At this stage of operation, the microprocessor based controller 252 determines via a linear variable displacement transducer whether surfaces are located within a predetermined allowance, statistically pre-established. If not, an error is called out, otherwise the microprocessor programming advances to the next and final welding step.

If no error occurs, the solid state power supply 250 then activates the transducer/booster 254, whereupon mechanical vibration arrives via the horn 256 to the tip 258. The insulation jacket 178 thus vibrates with the work surface 266 of the tip 258 relative to the wire 46. With continued vibration, the insulation jacket 178 heats and melts, thus flowing away from the area directly between the work surface 266 of the tip 258 and the top surface 277 of the base portion 126 as the tip vibrates and continues to be forced toward the anvil 260, as best shown in FIGS. 30C and 31.

Referring to FIG. 31, upon conclusion of the ultrasonic welding process, the insulation jacket 178 has formed a displacement mass 269 on diametrically opposing sides of an ultrasonic weld 272 where the tip 258 was located. At the weld 272, a copper conductor 270 of the wire 46 is exposed at one side and bonded by the ultrasonic weld 272 to the top surface 234 of the base portion 126 of the terminal 54. The vestibule 156 of the cavity 114 of the wafer 52 must be large enough to displace the mass 269 so that the melted insulating jacket does not flow into unwanted areas of the wafer cavity 114 which would disrupt the mating capability of the connector 44 or hinder the stacking of the wafers 52 to one-another. In-other-words, the displacement mass 269 must not flow or form appreciably forward of the initial cut-off surface 188 of the wire 46.

Figure 30A:
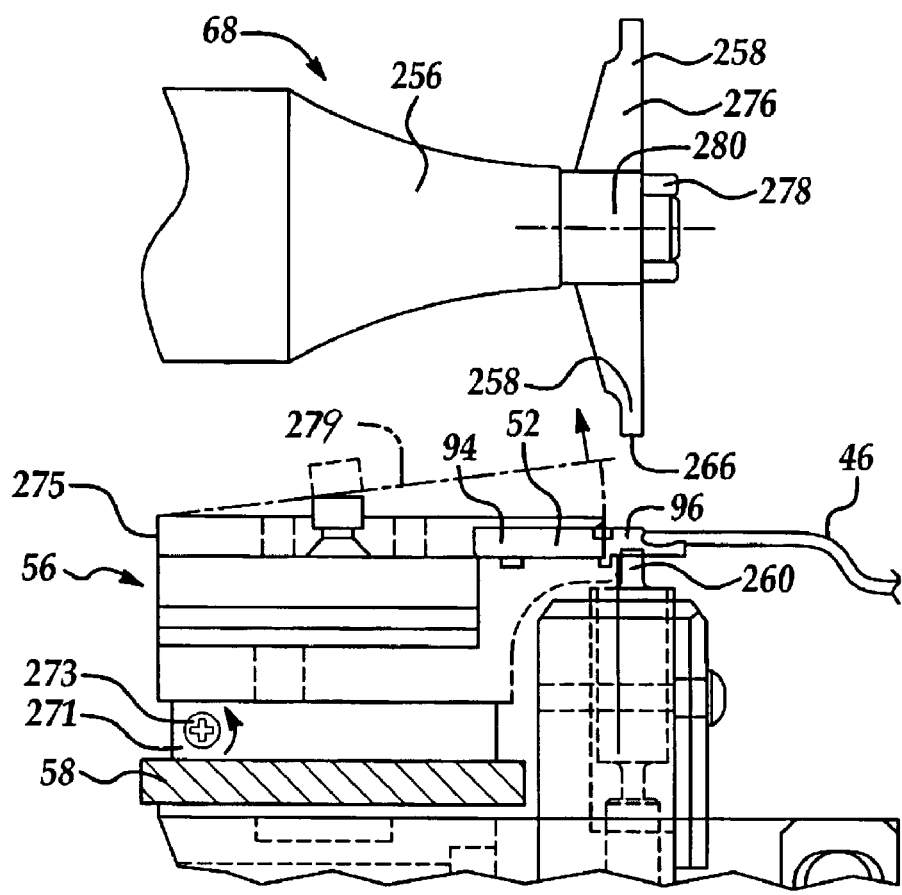
FIG. 30A is a side view of a tip prop of the ultrasonic welder station orientated over the wafer assembly held within the pallet of the wire harness manufacturing machine.
Figure 30B:
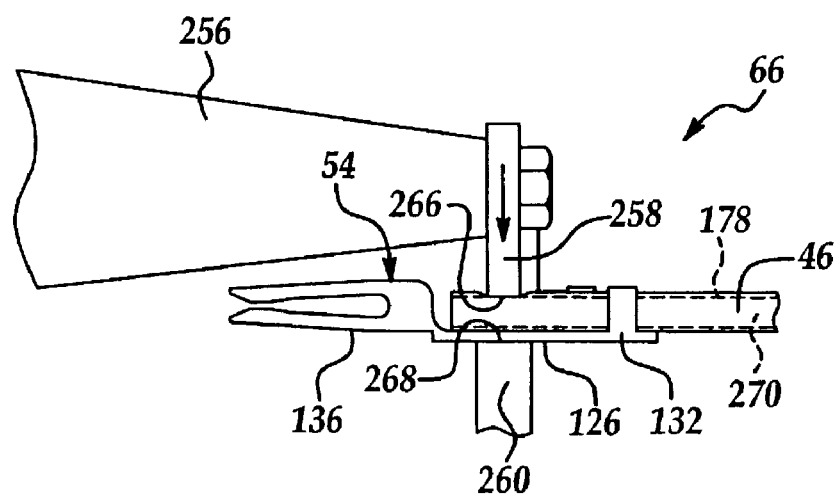
FIG. 30B is a side view of the tip prop orientated over a weld segment of the end portion of the wire with the terminal crimped to the end portion and the wafer and pallet removed to show detail.
Figure 30C:
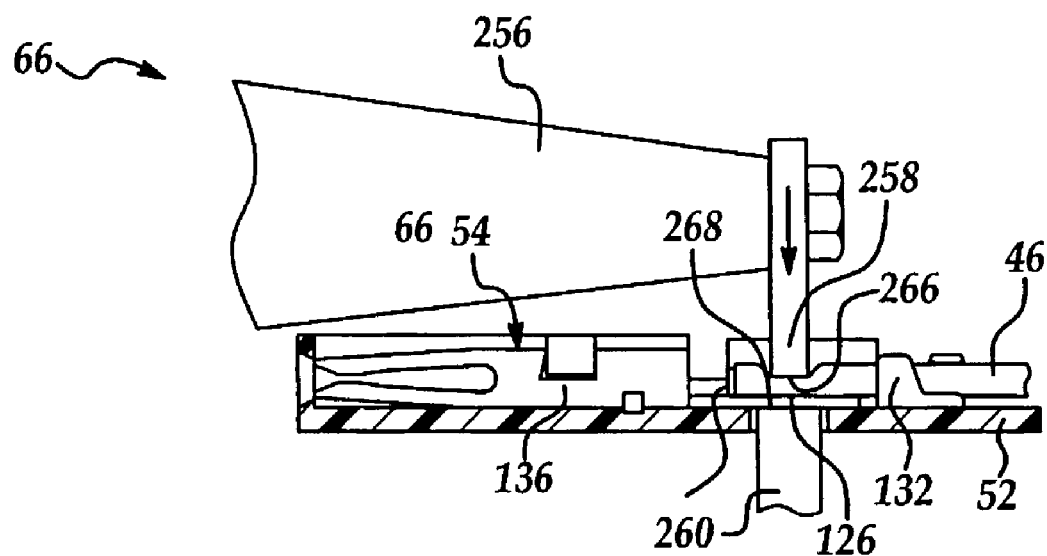
FIG. 30C is a side view of the tip prop orientated over and pressing into an insulation jacket of the weld segment of the wire to form a weld and with the pallet and portions of the wafer removed to show internal detail.
Figure 30D:
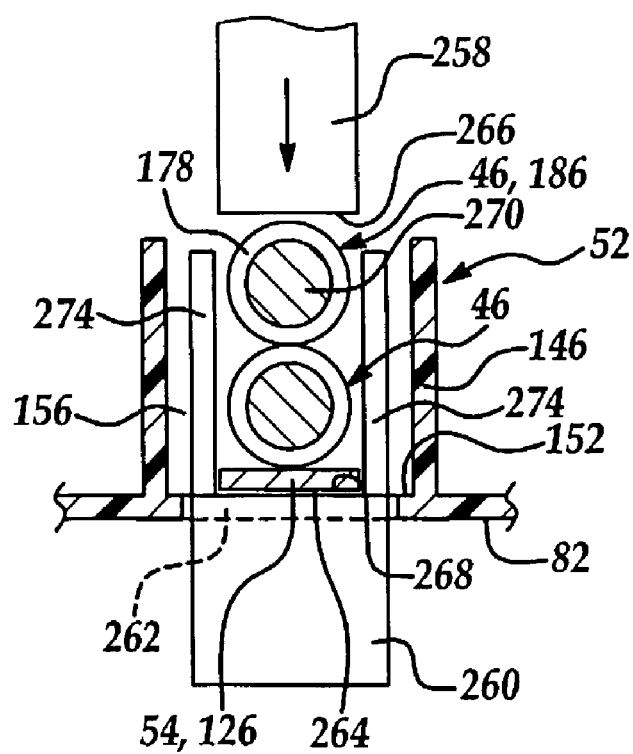
FIG. 30D is an enlarged lateral cross section of a tip, and an anvil of the ultrasonic welder station bearing down upon two wires and with the terminal seated within the surrounding wafer.
Figure 35:
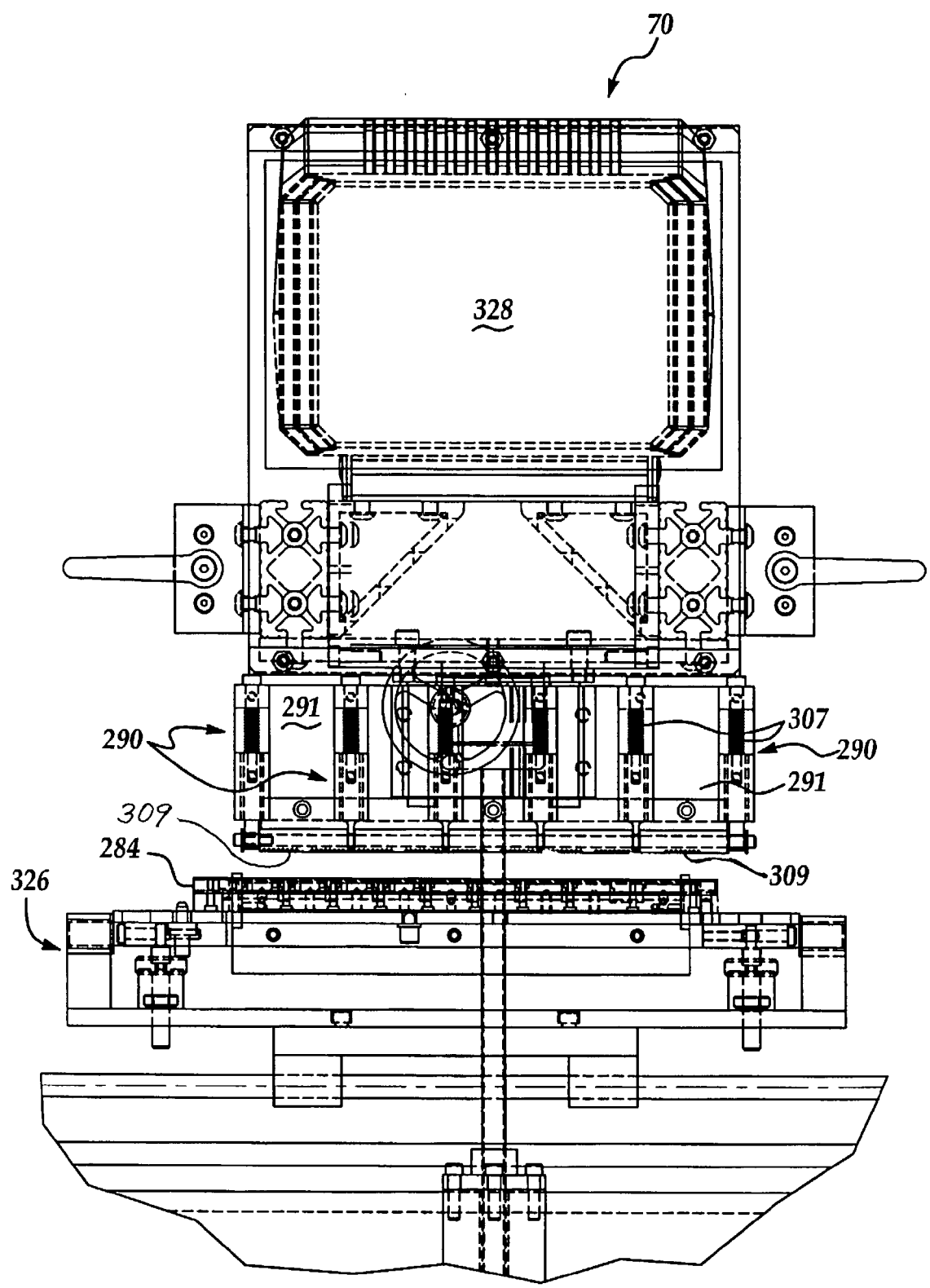
FIG. 35 is a front view of the wire marker station.

Referring to FIG. 30D, the ultrasonic welding process is capable of welding more than one wire 46 to a single terminal 54. As illustrated, two or more wires 46, preferably having ultra thin wall polyvinyl chloride insulation jackets 178, can be ultrasonic welded to one-another and to the terminal 54. The wires 46 are preferably gathered together via a pair of ears 274 disposed substantially parallel to each other. Because the base portion 126 of the terminal 54 extends between the ears 274, the ears are spaced apart from one another at a distance slightly greater than the width of the base portion 126. To enable a multi-wire weld 272, the width of the tip 258 is almost as great as the distance between the two ears 274. The idea being, any distance between the tip 258 and the ears 274 is smaller than the diameter of a single strand of wire conductor 270. This assures every strand remains under the tip 258 and thus exposed to the welding process. That is, all the strands of copper are captured under the welding tip and are not able to move laterally away from the weld area.

As best illustrated in FIGS. 30A and 32A–B, an elongated linear prop 276 is preferably unitary to the horn and carries two diametrically opposing tips 258 at respective ends. The unitary construction of the prop and horn is preferred for consistent control of the energy and amplitude through the horn to the weld. As an alternative, the prop 276 can be engaged to the end of the horn 256 via a threaded nut 278 which engages a threaded portion of the horn 256 that extends through a mid-point hole 280 carried by the prop 276. The prop 276 is thus disposed concentrically to the horn 256 and both as a single part are capable of rotating one hundred and eighty degrees to utilize the second tip 258 when the first tip 258 wears out or becomes damaged.

Having two tips 258 on each prop 276 reduces the cost of manufacturing the tip 258 and simplifies maintenance of the ultrasonic welder 68. The tips 258 are preferably made of a hardened steel which is coated with titanium nitride for wear. Other hard coat materials such as chromium nitrite are also acceptable. The tips are further void of any sharp edges which could damage or cut through the wire 46 prior to achieving an ultrasonic weld. As previously described, the tip work surface 266 is smooth and thus provides a quicker weld as opposed to neural patterns on the tip. Moreover, the smooth tip requires less machining to produce the tip tool. In order to ensure bonding of all the strands of the conductor 270 of the wire 46, the tip work surface 266 must be substantially parallel to the top surface 234 of the base portion 126 of the terminal 54 (i.e. as oppose to a concave geometry). A parallel geometry provides a uniform pressure or force across the weld, thereby bonding all the strands.

Referring to FIGS. 33A–C, the anvil 260 is carried by an elongated linear anvil prop 282. Like the tips 258, preferably a pair of anvils 260 are diametrically carried on respective ends of the anvil prop 282. Each anvil 260 supports the ears 274 as previously described. The ears 274 are preferably constructed and arranged to be detachable from the anvils 260. With this configuration, in the event that one or both of the ears 274 should break, replacement or maintenance is limited to the ears and not the whole anvil 260 and prop 282. The ears 274 are held to the anvil 260 by a dowel or pin (not shown). The anvil 260 is made of a hardened steel for purposes of wear. Because the ears 274 are exposed to lateral forces or shear stresses, the ear material is not as brittle as the anvil 260 material, and although hardened the ear steel is softer than the anvil material. Moreover, the ears 274 are not exposed, and need not withstand the wear, of the anvil 260, therefore, the ears 274 need not be as hard.

The methodology according to the present invention has great utility for the handling of small gauge wires 46, ranging at about twenty-six gauge. Small gauge wires are frequently very difficult to strip without injuring the wire 46. This is especially true for wires 46 having a stranded conductor or core 270. Consequently, ultrasonic welding of small gauge wires 46 is costly and difficult. However, the method according to the present invention does not require pre-stripping of wires, so that now small diameter wires, including thin and ultra-thin wires ranging in insulator thickness from 0.4 to 0.2 millimeters, can be economically attached to the terminals 54.

A test which ensures a reliable ultrasonic weld 272 is referred to as a simple pull test, wherein the physical strength of the weld is actually tested via the application of a mechanical force to see to if the bond breaks. When applying the pull test, the terminal 54 is held at one end and the wire 46 is pulled from an opposite end. If the weld holds, this confirms that the weld is good and will conduct electricity because plastic will not secure a weld to the metal terminal, so if there is substantial pull strength then you know that non-ferrous metal is welded to non-ferrous metal.

Although not illustrated, it is possible to form all the ultrasonic welds 272 across a single wafer at one time. However, each tip 258 for each respective terminal 54 must be capable of detecting the height and pressure necessary for the individual wire 46. Moreover, it may well be that the energy needed for each weld 272 varies from one wire to the next possibly do to varying oxidation or contamination levels between wires and/or terminals. Another possibility for multi-terminal bonding in a single step would be to use different tip sizes or tip dimensions so that the pressure and location of each is customized. That is, to customize or accommodate for any number of wires welded to one terminal 54 or any variation of wire gauges (i.e. 26 to 18 gauge). For a multi-wire bond in a single process, each tip could be customized and feedback could be provided for each individual tip 258 so that the process would be completed. Otherwise, if a single tip 258 is used which goes from one terminal 54 to the next, pre-programming of the controller 75 can anticipate or deal with the variations between each weld 272.

The utilization of ultrasonic welding technology allows for the assembly of wire harnesses 42 having wire diameters smaller than twenty-two gauge and ranging at about twenty-six gauge. This results in reduced wire harness 42 bundle size, reduced mass, reduced cost, and further eliminates wire stripping and the potential of strand breakage or cuts that stripping produces. Also, connection to ultra-thin wall wire or cable is now possible.

Referring to FIG. 1, with the welding process complete for every terminal 54 held within the wafers 52 which are held within the pallet 56, the conveyor 58 via the controller 75 moves the pallet 56 to the next station, identified as the wire marker 70.

The Wire Marker:

Referring to FIGS. 1 and 34–37, the conveyor 58 carries the pallet 56, the wafer assemblies 48 and the looped, terminated, wires 46 to the next station, identified as the wire marker or marker station 70. The wire marker 70 is preferably a carbon dioxide laser which burns identifying marks into the insulation jacket 178 of the wires 46. This laser marking technique allows the adoption of a one color per wire gauge size approach, eliminating the need to have each color wire for each respective gauge size.

In the printing or marking process, it is possible to use different color markings for different insulating jacket plastic materials. For instance, a light print on a dark jacket 178, or a dark print on a light jacket, will both give good visibility. The print color is actually the result of jacket discoloring due to the burning or exposure to intense light of the wire jacket 178. The color is thus dependent upon not only the material and/or additives of the jacket 178, but also the type of laser. For instance, a jacket material containing titanium dioxide will discolor with exposure to the beam of any one of a variety of laser types including that of a carbon dioxide laser.

The time to complete the printing process is dependent upon the number of printed characters and typically takes less than one second to mark one wire 46. The laser wire marker 70 allows the coding of each wire 46 within the harness 42. The coding can then be converted or provide the information necessary to establish when the wire was made, the wire specification, and its use to assist maintenance.

During operation of the laser wire marker 70, the pallet 56 is orientated side-by-side or adjacent to an elongated wire tray 284 which carries a series of laterally extending parallel grooves 286 defined on a top surface 288 of the tray 284. A comb device 290 of the marker 70 aligns and places each wire 46 over each respective groove 286. So that the wires 46 are placed within the grooves 286 of the tray 284 in a timely manner, each wafer assembly 48 preferably has its own comb device 290. The series of comb devices 290 are supported side-by-side and over the tray 284 by a substantially horizontal support member 291. The support member 291 is suspended from a rigid stationary structure 292 by a pneumatic or air cylinder 293 which is controlled by the controller 75 and is constructed and arranged to raise and lower the support member 291 and comb devices 290 toward and away from the tray 284.

The comb device 290 has a series of C-shaped members 294 engaged rigidly to the support member 291. An upper and lower arm 296, 298 are cantilevered and project away from the support member 291. The upper arm 296 carries a substantially vertical threaded hole 300 which receives a bolt or pin 302 which projects downward beyond the threaded hole 300 and into a non-threaded hole or round guide-way 304 carried by the lower arm 298. A hollow rod 306 is disposed slideably within the round guide-way 304 and concentrically receives the lower end of the pin 302. The rod 306 has an upward facing annular surface 308 which is in contact with an end of a vertically orientated coiled spring 307 which is disposed concentrically about the pin 302 and between the arms 296, 298. The spring 307 acts to bias a roller 309 engaged to the bottom end of the hollow rod 306 in an extended position below the lower arm 298.

In operation, the support member 291 and the air cylinder 293 move along the stationary structure 292 in a lateral direction of the tray and longitudinal direction of the wire 46 creating a rolling action of the comb device 290. A tilt mechanism 326 disposed substantially under the support member 291 tilts the pallet 56 toward the receiving tray 284 for initially aligning and placing the wires 46 into the grooves prior to marking the wires 46 by the laser 328. A series of spring loaded pins or fins 324, project downward from the support member 291, orienting the wires 46 to the respective grooves of the tray. The roller 309 is subsequently biased against the wire 46 by the resilient force of the spring 307 compressed between the annular surface 308 and the upper arm 296. The downward bearing force of the spring loaded roller 309 causes the wire to laterally fall snugly into the groove of the tray for marking by the laser. The springs 307 bias the rollers 309 in a downward direction creating a vertical displacement variance which allows for a range of different gauged wires 46.

Referring to FIG. 1, once the wires 46 are marked, the conveyor 58 advances the loaded pallet 56 to the wire harness station 72. The wafer assemblies 48 and welded wires 46 are then removed from the pallet 56 at the wire harness station 72 and the empty pallets 56 are placed in the second pallet station 74 for reuse and possible reconfiguration. The automation process of the wire harness 42 is thus complete and the wafer assemblies 48 are then manually loaded into their respective connector housings 50 to complete assembly of the connectors 44 and wire harness 42.

Additional Features of Wafer

Many features and attributes of the wafer 52 have been described as they relate and are required in the overall automatic manufacturing process of the wire harness 42. However, certain attributes previously discussed and elements not yet discussed of the wafer 52 are multi-functional and provide features which are advantageous to the product itself, separate from the manufacturing process.

For instance, referring again to FIGS. 3, 5–9, and 19–20, during the injection molding process of the wafer 52, the wafer rib 100 provides a flow path for the melted plastic and later adds rigidity to the solidified wafer 52. Moreover, during final assembly of the electrical connector 44, the rib 100 of one of the stacking wafer assemblies 48 projects snugly into a lateral clearance 311 of the adjacent stacking wafer assembly 48. When the wafers are stacked, the rib 100 of one wafer 52 bears down upon all of the ledges 176 of the next adjacent wafer 52 adding strength to the lock feature 160. Moreover, when the wafers are stacked, a front surface 310 of the rib 100 bears against a rear edge or surface 312 of the plate 140 of the tuning-fork portion 136 of the terminal 54, adding yet a third locking feature 314 which prevents the terminals 54 from moving backwards within the cavities 114 during connection with a mating connector, as best shown in FIGS. 18 and 19.

Once the wafer assemblies 48 are stacked to one another, they are slid laterally in the direction of arrow 315 and through a side opening 316 carried by the connector housing 50. The housing itself carries a clearance or lateral groove 318 which receives the rib 100 of the bottom wafer assembly 48 indexing the wafers to the housing 50. Although not shown, the housing 50 preferably has a rib disposed opposite the groove 318 which is received by the clearance 308 of the top wafer assembly 48. With the wafer assemblies 48 properly indexed within the housing 50, a cap 320 of the connector 44 is constructed and arranged to slide longitudinally of the wafer assemblies 48 and in the direction of arrow 321 which is disposed substantially perpendicular to arrow 315. The cap 320 slides upon a rail type interface with the housing 50 until the cap snap locks to the housing 50, thus sealing off the side opening 316 and securing the wafer assemblies 48 within the connector housing 50.

The wafers 52 can also be designed slightly different from one-another to assure proper stacking order. For instance, the plastic of the wafer can be of various colors and/or they may include stacking order index features such as a small tab on one wafer which fits into a hole of the adjacent wafer. The tabs and holes may vary in location depending upon the stacking order.

The wafer assembly design need not be limited to wire harnesses, but can be utilized in a wide variety of applications. For instance, the wafers can be utilized as fuse box receptacles. They can be stacked on top of one-another and side-by-side to form multiple rows and columns. The terminals 54 may then mate to dual bladed fuses which extend between wafers.

Additional Features of Terminal

Referring to FIG. 16, many features and attributes of the terminal 54 have been described as they relate and are required in the overall automatic manufacturing process of the wire harness 42. However, certain attributes previously discussed and elements not yet discussed of the terminal 54 are multi-functional and provide features which are advantageous to the product itself, independent of the manufacturing process.

For instance, the thick stock tuning fork portion 136 of the terminal 54 has lower bulk resistance than thinner stock "formed" terminals commonly used. The "blank" style contact of the flats or tuning fork portion 136 is more accurate and stable than "formed" contacts commonly used, resulting in a more consistent contact and pin terminal engagement force. The thin stock of the crimping portion 132 provides for maximum range of wire gauge capability. During manufacturing of the terminal 54, the short progression of the terminal 54 allows multiple terminals to be formed in a single die stroke, and the carrier-through-terminal body configuration with intermittent blanks 125 reduces material usage and cost. The open contact design of the base portion 126 facilitates post-stamp plating.

While the forms of the invention herein disclosed constitute presently preferred embodiments, many others are possible. It is not limited herein to mention all the possible equivalent forms or ramifications of the invention. It is understood that the terms used herein are merely descriptive rather than limiting and that various changes may be made without departing from the spirit or scope of the invention.

The invention claimed is:

1. A wire harness manufacturing machine for attaching a terminal to a wire having a surrounding insulation jacket comprising:

a wire loader station constructed and arranged to measure and cut a wire having a surrounding insulation jacket and crimp a terminal to the insulation jacket of the wire during a loading process;

an ultrasonic welder station having a tip arranged for direct contact with the insulation jacket of the wire and an opposing anvil arranged for direct contact with the terminal during a welding process, so that the terminal and the insulation jacket of the wire can be disposed directly between the tip and the anvil and in direct contact with each other;

the tip and anvil being constructed and arranged to compress the wire directly to the terminal while galling a conductive core of the wire to the terminal, the wire loader station and the ultrasonic welder station being in consecutive order, wherein the wire loader station has a pair of opposing grippers for releasably gripping the insulation jacket, and a plunger that slides between the opposing grippers, the plunger having a longitudinal rib or elongated peak arranged to create a longitudinal imprint or split in the insulation jacket at a weld segment, and the terminal and the tip of the ultrasonic welder station are constructed and arranged to be in compressive direct contact with the insulation jacket at a weld segment of the insulator jacket so that the insulation jacket flows away from the conductive core of the wire at the weld segment to form a displacement mass during an ultrasonic welding process.

2. The wire harness manufacturing machine set forth in claim 1 comprising:

the anvil having an upward facing work surface for directly contacting a bottom surface of the terminal; and the ultrasonic welder station having a pair of ears projecting between the tip and the anvil, wherein the work surface is disposed substantially between the pair of ears to trap the conductive core between the tip and the terminal during the welding process.

3. The wire harness manufacturing machine set forth in claim 1 wherein the plunger has a concave crimp portion for engaging a crimp wing of the terminal.

4. A wire harness manufacturing machine in combination with a terminal having a flat wingless base portion to a wire having a surrounding insulation jacket comprising:

a wire loader station constructed and arranged to measure, cut, place and crimp a wire to a terminal of a wire harness during a loading process;

an ultrasonic welder station having a tip arranged for direct contact with the wire and an opposing anvil arranged for direct contact with the terminal during a welding process, so that the terminal and the wire can be disposed directly between the tip and the anvil and in direct contact with each other; and wherein the tip and anvil are constructed and arranged to compress the wire directly to the terminal while galling a conductive core of the wire to the terminal, the anvil having an upward facing work surface for directly contacting the flat wingless base portion of the terminal;

the tip having a downward facing work surface for directly contacting an insulation jacket of the wire during initiation of a welding process; and the ultrasonic welder station having props engaged to and for supporting the tip and the anvil respectively, and a pair of ears engaged to one of the props, wherein the pair of ears extend upward on either side of the terminal for trapping the wire laterally between the tip and the terminal during the welding process;

the pair of ears being spaced apart from each other at a distance slightly greater than the width of the flat wingless base portion of the terminal.

5. The wire harness manufacturing machine set forth in claim 4 wherein the tip has a width almost as great as the distance between the pair of ears.

6. The wire harness manufacturing machine set forth in claim 4 wherein the work surface of the tip is smooth and the work surface of the anvil is knurled.

7. The wire harness manufacturing machine set forth in claim 4 wherein the pair of ears are constructed and arranged to be detachable from the prop.

8. The wire harness manufacturing machine set forth in claim 7 wherein the pair of ears are made of a softer metal than the anvil.

9. The wire harness manufacturing machine set forth in claim 8 wherein the tip and the anvil are made of hardened steel.

10. The wire harness manufacturing machine set forth in claim 8 wherein the anvil, the pair of ears, and the tip are coated with titanium nitride.

11. The wire harness manufacturing machine set forth in claim 4 wherein the pair of ears are engaged to the one of the props supporting the anvil.

* * * * *